US012451060B2

(12) United States Patent
Zhang et al.

(10) Patent No.: US 12,451,060 B2
(45) Date of Patent: Oct. 21, 2025

(54) DISPLAY PANEL, DRIVING METHOD THEREOF, AND DISPLAY APPARATUS

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Mengmeng Zhang, Wuhan (CN); Yana Gao, Wuhan (CN); Gaojun Huang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 71 days.

(21) Appl. No.: 18/369,921

(22) Filed: Sep. 19, 2023

(65) Prior Publication Data

US 2024/0013714 A1 Jan. 11, 2024

(30) Foreign Application Priority Data

Apr. 14, 2023 (CN) ........................ 202310409212.4

(51) Int. Cl.
*G09G 3/3208* (2016.01)

(52) U.S. Cl.
CPC ... *G09G 3/3208* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2320/0247* (2013.01)

(58) Field of Classification Search
CPC ............... G09G 3/3233; G09G 3/3208; G09G 2300/0842; G09G 2320/0247; G09G 2300/0861; G09G 2310/08; G09G 2300/0819; G09G 2320/0233
See application file for complete search history.

(56) References Cited

U.S. PATENT DOCUMENTS

| | | | | |
|---|---|---|---|---|
| 2016/0321990 | A1* | 11/2016 | Kim | G09G 3/3233 |
| 2022/0122500 | A1* | 4/2022 | Wai | G09G 3/2014 |
| 2022/0335872 | A1* | 10/2022 | Zhang | G09G 3/20 |
| 2022/0375400 | A1* | 11/2022 | Kim | G09G 5/391 |

(Continued)

FOREIGN PATENT DOCUMENTS

| | | | |
|---|---|---|---|
| CN | 114842805 | A | 8/2022 |
| CN | 115346483 | A | 11/2022 |

*Primary Examiner* — Doon Y Chow
(74) *Attorney, Agent, or Firm* — KDW Firm PLLC

(57) ABSTRACT

Provided are a display panel, a driving method thereof and a display apparatus. The display panel includes bias signal lines and pixel circuits. A pixel circuit includes a drive module and a bias module. The bias module is connected between a first terminal of the drive module and a bias signal line. A display region of the display panel includes a first display region and a second display region. The bias signal lines include a first bias signal line and a second bias signal line. Bias modules in the first display region are connected to the first bias signal line. Bias modules in the second display region are connected to the second bias signal line. In at least part of turning-on stages of bias modules, a voltage transmitted by the first bias signal line is different from a voltage transmitted by the second bias signal line.

20 Claims, 12 Drawing Sheets

(56) References Cited

U.S. PATENT DOCUMENTS

2023/0098040 A1* 3/2023 Zhou .................... G09G 3/3233 345/55
2023/0108303 A1* 4/2023 Xie ...................... G09G 3/3233 345/690
2023/0178010 A1* 6/2023 Yuan .................... G09G 3/3233 345/55
2023/0206854 A1* 6/2023 Kim ..................... G09G 3/3266 345/699
2023/0215314 A1* 7/2023 Ke ......................... H10K 59/00 345/443

* cited by examiner

DISPLAY PANEL, DRIVING METHOD THEREOF, AND DISPLAY APPARATUS

CROSS-REFERENCE TO RELATED APPLICATIONS

This application claims the priority to Chinese Patent Application No. 202310409212.4 filed on Apr. 14, 2023, the disclosure of which is incorporated herein by reference in its entirety.

TECHNICAL FIELD

Embodiments of the present invention relate to the field of display technology and, in particular, to a display panel, a driving method thereof, and a display apparatus.

BACKGROUND

With the continuous development of display technology, people have increasingly higher requirements for the performance of a display panel. At present, a flicker problem occurs when a related display panel works. Moreover, different display regions have different display effects, resulting in a "screen-splitting" phenomenon on a display image.

SUMMARY

In a first aspect, embodiments of the present invention provide a display panel. The display panel includes a display region, bias signal lines, and a plurality of rows of pixel circuits. A pixel circuit among the plurality of rows of pixel circuits includes a drive module and a bias module. The drive module is configured to drive a light-emitting element. The bias module is connected between a first terminal of the drive module and a bias signal line among the bias signal lines and is configured to write a voltage on the bias signal line to the first end of the drive module when the bias module is turned on.

The display region includes a first display region and a second display region. The bias signal lines include a first bias signal line and a second bias signal line. Bias modules in the first display region are connected to the first bias signal line. Bias modules in the second display region are connected to the second bias signal line. In at least part of turning-on stages of bias modules, a voltage transmitted by the first bias signal line is different from a voltage transmitted by the second bias signal line.

In a second aspect, embodiments of the present invention further provide a driving method of a display panel. The display panel has a display region. The display panel includes bias signal lines and a plurality of rows of pixel circuits. The plurality of rows of pixel circuits are located in the display region. A pixel circuit among the plurality of rows of pixel circuits includes a drive module and a bias module. The drive module is configured to drive a light-emitting element. The bias module is connected between a first terminal of the drive module and a bias signal line among the bias signal lines and the bias module is configured to write a voltage on the bias signal line to the first end of the drive module when the bias module is turned on. The display region includes a first display region and a second display region. The bias signal lines include a first bias signal line and a second bias signal line. Bias modules in the first display region are connected to the first bias signal line. Bias modules in the second display region are connected to the second bias signal line.

The driving method of a display panel includes the steps below.

Voltages are supplied to the first bias signal line and the second bias signal line separately. In at least part of turning-on stages of bias modules, a voltage transmitted by the first bias signal line is different from a voltage transmitted by the second bias signal line.

In a third aspect, embodiments of the present invention provide a display apparatus. The display apparatus includes a display panel. The display panel includes a display region, bias signal lines, and a plurality of rows of pixel circuits. A pixel circuit among the plurality of rows of pixel circuits includes a drive module and a bias module. The drive module is configured to drive a light-emitting element. The bias module is connected between a first terminal of the drive module and a bias signal line among the bias signal lines and is configured to write a voltage on the bias signal line to the first end of the drive module when the bias module is turned on.

The display region includes a first display region and a second display region. The bias signal lines include a first bias signal line and a second bias signal line. Bias modules in the first display region are connected to the first bias signal line. Bias modules in the second display region are connected to the second bias signal line. In at least part of turning-on stages of bias modules, a voltage transmitted by the first bias signal line is different from a voltage transmitted by the second bias signal line.

BRIEF DESCRIPTION OF DRAWINGS

To illustrate the technical solutions in embodiments of the present invention more clearly, drawings used in the description of the embodiments are briefly described below. Apparently, the drawings described below only illustrate part of embodiments of the present invention, and those of ordinary skill in the art may obtain other drawings based on the drawings on the premise that no creative work is done.

DETAILED DESCRIPTION

Technical solutions in embodiments of the present invention are described clearly and completely in conjunction with drawings in embodiments of the present invention from which technical solutions of the present invention are better understood by those skilled in the art. Apparently, the embodiments described below are part, not all, of embodiments of the present invention. Based on embodiments of the present invention, all other embodiments obtained by those of ordinary skill in the art on the premise that no creative work is done are within the scope of the present invention.

It is to be noted that terms such as "first" and "second" in the description, claims and drawings of the present invention are used for distinguishing between similar objects and are not necessarily used for describing a particular order or sequence. It is to be understood that the data used in this manner are interchangeable in appropriate cases so that embodiments of the present invention described herein can be implemented in an order not illustrated or described herein. Additionally, the terms "including", "having" and variations thereof are intended to encompass a non-exclusive inclusion. For example, a process, method, system, product, or device that includes a series of steps or units not only includes the expressly listed steps or units but may also include other steps or units that are not expressly listed or are inherent to such process, method, product, or device. It is apparent to those skilled in the art that various modifications and variations in the present invention may be made without departing from the spirit or scope of the present invention. Therefore, the present invention is intended to cover modifications and variations of the present invention that fall within the scope of the corresponding claims (the claimed technical solutions) and their equivalents. It is to be noted that embodiments of the present invention, if not in collision, may be combined with each other.

As mentioned in BACKGROUND, a flicker problem occurs when a related display panel works. Moreover, different display regions have different display effects, resulting in a "screen-splitting" phenomenon on a display image. Through research, an inventor finds that the reason for the preceding problem is specifically as below.

Figure 1:
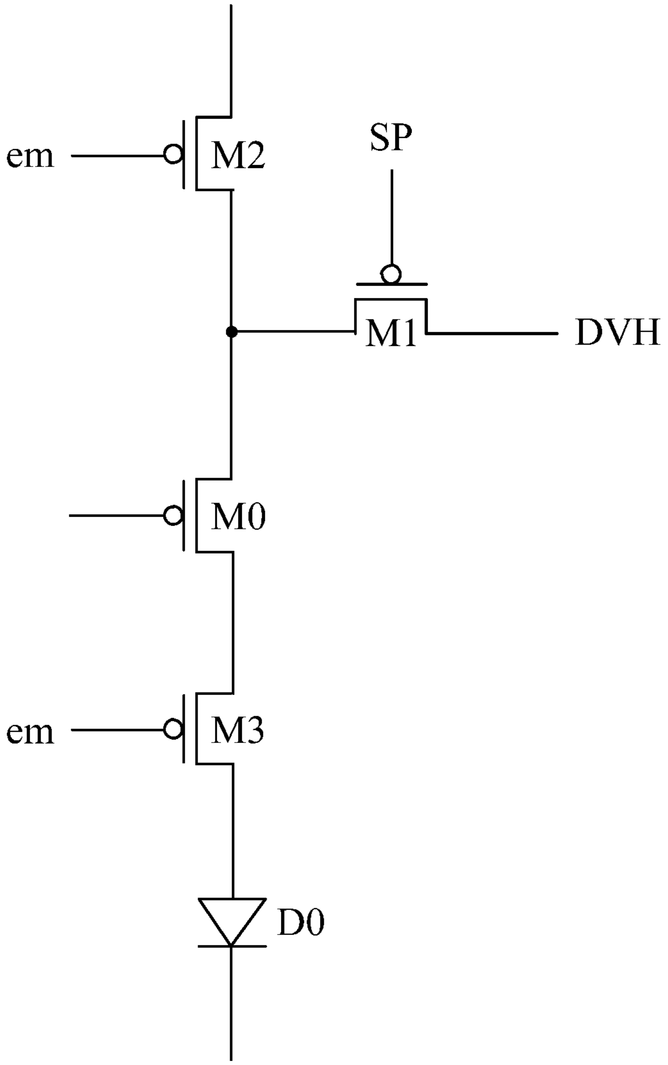
FIG. 1 is a structural diagram of a pixel circuit applicable to a display panel.
Figure 2:
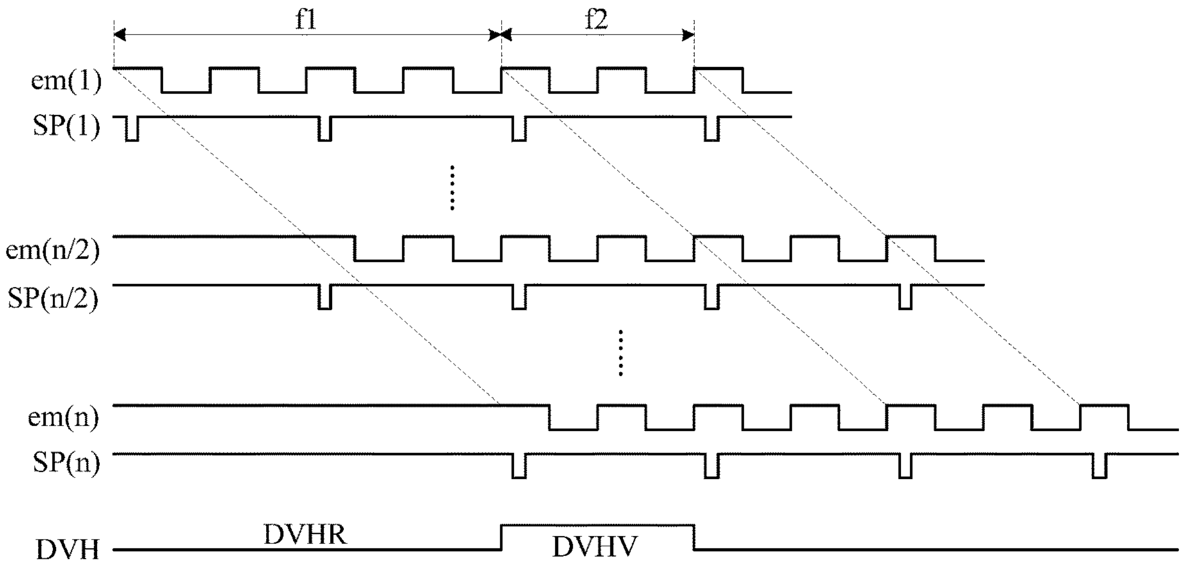
FIG. 2 is a drive timing diagram of each row of pixel circuits in the display panel.

FIG. 1 is a structural diagram of a pixel circuit applicable to a display panel. FIG. 2 is a drive timing diagram of each row of pixel circuits in the display panel. For ease of differentiation, in FIG. 2, em(i) denotes a light emission control signal em input to the i-th row of pixel circuits in the display panel. SP(i) denotes a scan signal SP input to the i-th row of pixel circuits in the display panel. Referring to FIGS. 1 and 2, the display panel includes n rows of pixel circuits. A pixel circuit includes a drive transistor M0, a first transistor M1, a second transistor M2, a third transistor M3, and a light-emitting element D0. First transistors M1 in each row of pixel circuits are connected to a bias signal line DVH. The first transistor M1 is turned on in response to a low level in the scan signal SP and transmits a voltage from the bias signal line DVH to a first pole of the drive transistor M0 to adjust the bias state of the drive transistor M0. The second transistor M2 and the third transistor M3 are turned on in response to a low level in the light emission control signal em, and a discharge path is formed between the second transistor M2, the drive transistor M0, the third transistor M3 and the light-emitting element D0 so as to drive the light-emitting element D0 to emit light through the drive transistor M0.

The display panel includes different display stages. In the related art, in order to improve the display effect, different bias voltages are usually used at different display stages for adjusting the bias state of the drive transistor M0 in the pixel circuit. As shown in FIG. 2, the bias signal line DVH connected to each row of pixel circuits inputs a first bias voltage DVHR at a first display stage f1 of the first row of pixel circuits and inputs a second bias voltage DVHV at a second display stage f2 of the first row of pixel circuits. The voltage input from the bias signal line DVH changes when the first row of pixel circuits enters the second display stage f2, so as to adjust the bias state of the drive transistor M0 through the first bias voltage DVHR at the first display stage f1 and adjust the bias state of the drive transistor M0 through the second bias voltage DVHV at the second display stage f2. However, when the first row of pixel circuits enter the second display stage f2, the n/2-th row of pixel circuits to the n-th row of pixel circuits are still at the first display stage f1. The bias voltage required by the n/2-th row of pixel circuits to the n-th row of pixel circuits is the first bias voltage DVHR. The voltage input from the bias signal line DVH is not applicable to the n/2-th row of pixel circuits to the n-th row of pixel circuits, so that the brightness of light-emitting elements D0 in the n/2-th row of pixel circuits to the n-th row of pixel circuits has an abrupt change with respect to the brightness of light-emitting elements D0 in the remaining rows of pixel circuits. That is, the brightness of the lower half of the display region of the display panel has an abrupt change with respect to the brightness of the upper half of the display region of the display panel. A flicker phenomenon may occur in the lower half of the display region. Moreover, the display effect of the upper half of the display region differs from the display effect of the lower half of the display region, resulting in a "screen-splitting" phenomenon on a display image.

For this reason, embodiments of the present invention provide a display panel to balance display effects of different display regions in the display panel, thereby alleviating the flicker and screen-splitting phenomena on the display panel.

Figure 3:
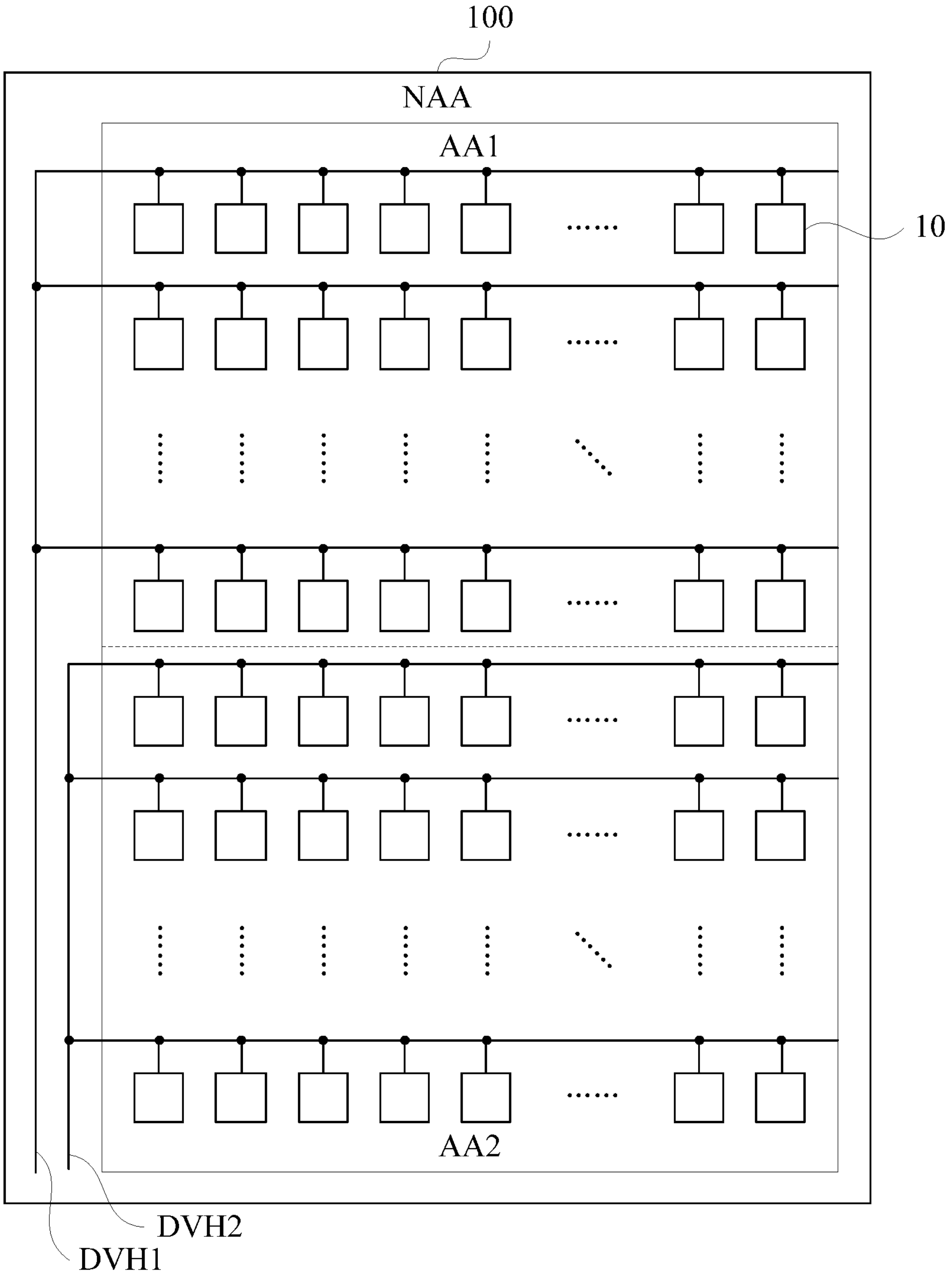
FIG. 3 is a structural diagram of a display panel according to an embodiment of the present invention.
Figure 4:
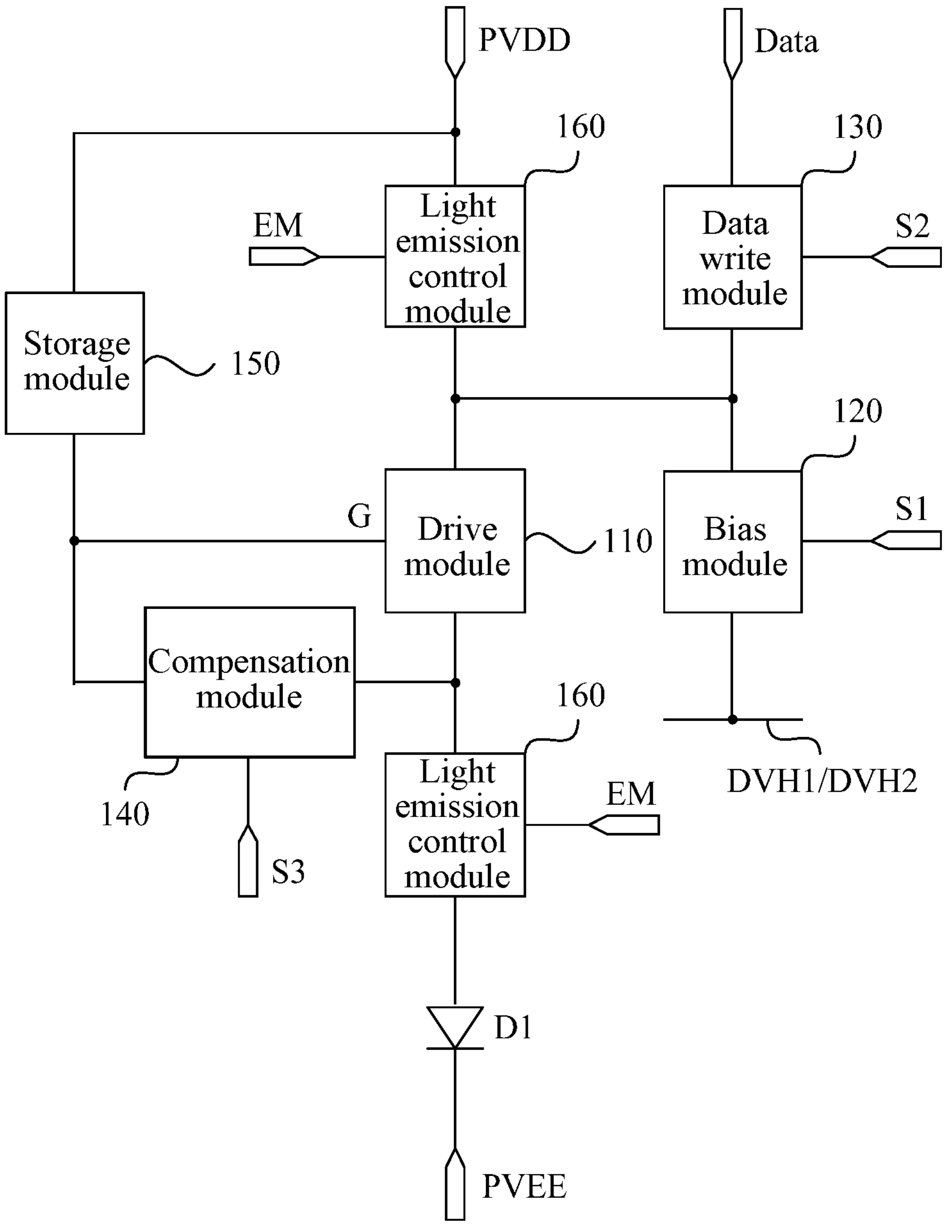
FIG. 4 is a structural diagram of a pixel circuit according to an embodiment of the present invention.

FIG. 3 is a structural diagram of a display panel according to an embodiment of the present invention. FIG. 4 is a structural diagram of a pixel circuit according to an embodiment of the present invention. Referring to FIGS. 3 and 4, the display panel 100 has a display region and a non-display region NAA. The display panel 100 includes bias signal lines and a plurality of rows (multiple rows) of pixel circuits 10. A pixel circuit 10 includes a drive module 110 and a bias module 120. The drive module 110 is configured to drive a light-emitting element D1. The bias module 120 is connected between a first terminal of the drive module 110 and a bias signal line and is configured to write a voltage on the bias signal line to the first end of the drive module 110 when the bias module is turned on.

The display region includes a first display region AA1 and a second display region AA2. The bias signal lines include a first bias signal line DVH1 and a second bias signal line DVH2. Bias modules 120 in the first display region AA1 are connected to the first bias signal line DVH1. Bias modules 120 in the second display region AA2 are connected to the second bias signal line DVH2. In at least part of turning-on stages of bias modules 120, a voltage transmitted by the first bias signal line DVH1 is different from a voltage transmitted by the second bias signal line DVH2.

Specifically, the first display region AA1 and the second display region AA2 may be any two different regions of the display panel 100. The first display region AA1 and the second display region AA2 each include at least one row of pixel circuits 10. In an embodiment, as shown in FIG. 3, the first display region AA1 and the second display region AA2 are adjacent to each other. For example, the last row of pixel circuits 10 in the first display region AA1 may be adjacent to the first row of pixel circuits 10 in the second display region AA2. In other embodiments, the first display region AA1 and the second display region AA2 may also be spaced apart. For example, at least one row of pixel circuits 10 may be placed between the first display region AA1 and the second display region AA2. The first display region AA1 and the second display region AA2 may merely occupy part of the display region of the display panel 100. Alternatively, the first display region AA1 and the second display region AA2 may constitute the entire display region of the display panel 100.

The light-emitting element D1 in the display panel 100 may be an organic light-emitting diode (OLED). One display period of the pixel circuit 10 includes a light emission stage and a non-light-emission stage. The drive module 110 is used for driving the light-emitting element D1 at the light emission stage. The non-light-emission stage may include at least two bias stages. The bias module 120 is used for turning on at a bias stage, transmitting a voltage input from a bias signal line to the first end of the drive module 110, and resetting a voltage of the first end of the drive module 110 to adjust the bias state of the drive module 110, so that the drive module 110 is in the on-bias (OBS) state, thereby contributing to improving display uniformity.

Bias modules 120 of each row of pixel circuits 10 in the first display region AA1 are each connected to the first bias signal line DVH1 so that the bias modules 120 of each row of pixel circuits 10 in the first display region AA1 transmit the voltage input from the first bias signal line DVH1 to first terminals of drive modules 110 at a bias stage, thereby adjusting the bias states of the drive modules 110 through the voltage input from the first bias signal line DVH1. Bias modules 120 of each row of pixel circuits 10 in the second display region AA2 are each connected to the second bias signal line DVH2 so that the bias modules 120 of each row of pixel circuits 10 in the second display region AA2 transmit the voltage input from the second bias signal line DVH2 to first terminals of drive modules 110 at a bias stage, thereby adjusting the bias states of the drive modules 110 through the voltage input from the second bias signal line DVH2.

Illustratively, the first bias signal line DVH1 may input different bias voltages at different bias stages of pixel circuits 10 in the first display region AA1 so that the bias states of the drive modules 110 are adjusted according to the voltage states of the drive modules 110 at different bias stages, thereby improving the bias effect. Similarly, the second bias signal line DVH2 may input different bias voltages at different bias stages of pixel circuits 10 in the second display region AA2 so that the bias states of the drive modules 110 are adjusted according to the voltage states of the drive modules 110 at different bias stages, thereby improving the bias effect.

Illustratively, the first display region AA1 is located before the second display region AA2. That is, the scanning and driving sequence of each row of pixel circuits 10 in the first display region AA1 is before the scanning and driving sequence of each row of pixel circuits 10 in the second display region AA2. For example, the non-light-emission stage of pixel circuits 10 includes two bias stages. In this case, the two bias stages correspond to different bias voltages. The first bias signal line DVH1 inputs different bias voltages at the two bias stages of pixel circuits 10 in the first display region AA1. The second bias signal line DVH2 inputs different bias voltages at the two bias stages of pixel circuits 10 in the second display region AA2. The first display region AA1 and the second display region AA2 each have at least one row of pixel circuits 10 satisfying the working timing below.

In case that the bias modules 120 of the pixel circuits 10 in the first display region AA1 work at the latter bias stage of the two bias stages, and the bias modules 120 of the pixel circuits 10 in the second display region AA2 work at the former bias stage of the two bias stages, the first bias signal line DVH1 transmits a bias voltage corresponding to the latter bias stage to the bias modules 120 of the pixel circuits 10 in the first display region AA1, and the second bias signal line DVH2 transmits a bias voltage corresponding to the former bias stage to the bias modules 120 of the pixel circuits 10 in the second display region AA2, that is, in at least part of turning-on stages of the bias modules 120 of the at least one row of pixel circuits 10 in the first display region AA1, the first bias signal line DVH1 and the second bias signal line DVH2 transmit different voltages. Moreover/alternatively, in case that the bias modules 120 of the pixel circuits 10 in the second display region AA2 work at the latter bias stage of the two bias stages of the current display period, and the bias modules 120 of the pixel circuits 10 in the first display region AA1 work at the former bias stage of the two bias stages of the next display period, the second bias signal line DVH2 transmits a bias voltage corresponding to the latter bias stage to the bias modules 120 of the pixel circuits 10 in the second display region AA2, and the first bias signal line DVH1 transmits a bias voltage corresponding to the former bias stage to the bias modules 120 of the pixel circuits 10 in the first display region AA1, that is, in at least part of turning-on stages of the bias modules 120 of the at least one row of pixel circuits 10 in the second display region AA2, the first bias signal line DVH1 and the second bias signal line DVH2 transmit different voltages. With this arrangement, the pixel circuits 10 in the first display region AA1 and the pixel circuits 10 in the second display region AA2 can each adjust the bias states of drive modules 110 at bias stages with appropriate bias voltages. Moreover, the pixel circuits 10 in the first display region AA1 and the pixel circuits 10 in the second display region AA2 use the same bias voltage at the same bias stage and use different bias voltages at different bias stages, helping guarantee the bias effect of the pixel circuits 10 in the first display region AA1 and the pixel circuits 10 in the second display region AA2 at different bias stages, enabling the drive modules 110 of the pixel circuits 10 in the first display region AA1 and the pixel circuits 10 in the second display region AA2 to have a similar or even the same bias state at the same bias stage, contributing to balancing the display effect of the first display region AA1 and the display effect of the second display region AA2, and thereby alleviating the flicker and screen-splitting phenomena of the display panel 100.

Above all, in this embodiment of the present application, the bias modules in the first display region are connected to the first bias signal line, and the bias modules in the second display region are connected to the second bias signal line. With this arrangement, in at least part of turning-on stages of the bias modules of the at least one row of pixel circuits in the first display region or the second display region, the first bias signal line and the second bias signal line transmit different voltages. In this case, the pixel circuits in the first display region and the pixel circuits in the second display region can each adjust the bias states of drive modules at bias stages with appropriate bias voltages, contributing to balancing the display effect of the first display region and the display effect of the second display region, and thereby alleviating the flicker and screen-splitting phenomena of the display panel.

Referring to FIGS. 3 and 4, on the basis of the preceding embodiments, optionally, the bias module 120 is configured to be turned on at a first bias stage and at a second bias stage. The bias signal line is configured to input a first bias voltage at the first bias stage of each row of pixel circuits 10 in a corresponding display region and input a second bias voltage at the second bias stage of each row of pixel circuits 10 in the corresponding display region.

Specifically, the first bias voltage and the second bias voltage are different in magnitude. One display period of the pixel circuit 10 may include multiple light emission stages and multiple non-light-emission stages. The first bias stage and the second bias stage are located at different non-light-emission stages. The first bias signal line DVH1 is configured to input the first bias voltage at the first bias stage of each row of pixel circuits 10 in the first display region AA1 and input the second bias voltage at the second bias stage of each row of pixel circuits 10 in the first display region AA1. The second bias signal line DVH2 is configured to input the first bias voltage at the first bias stage of each row of pixel circuits 10 in the second display region AA2 and input the second bias voltage at the second bias stage of each row of pixel circuits 10 in the second display region AA2.

Optionally, the first bias stage is located before the second bias stage in the same display period as the first bias stage. The first display region AA1 and the second display region AA2 each have at least one row of pixel circuits 10 satisfying the working timing below.

In case that the bias modules 120 of the pixel circuits 10 in the first display region AA1 work at the second bias stage, and the bias modules 120 of the pixel circuits 10 in the second display region AA2 still work at the first bias stage, the first bias signal line DVH1 transmits the second bias voltage to the bias modules 120 of the pixel circuits 10 in the first display region AA1, and the second bias signal line DVH2 transmits the first bias voltage to the bias modules 120 of the pixel circuits 10 in the second display region AA2, that is, at the second bias stage of the bias modules 120 of the at least one row of pixel circuits 10 in the first display region AA1, the first bias signal line DVH1 and the second bias signal line DVH2 transmit different voltages. Moreover/alternatively, in case that the bias modules 120 of the pixel circuits in the second display region AA2 work at the second bias stage in the current display period, and the bias modules 120 of the pixel circuits 10 in the first display region AA1 work at the first bias stage in the next display period, the second bias signal line DVH2 transmits the second bias voltage to the bias modules 120 of the pixel circuits 10 in the second display region AA2, and the first bias signal line DVH1 transmits the first bias voltage to the bias modules 120 of the pixel circuits 10 in the first display region AA1, that is, at the second bias stage of the bias modules 120 of the at least one row of pixel circuits 10 in the second display region AA2, the first bias signal line DVH1 and the second bias signal line DVH2 transmit different voltages.

Figure 5:
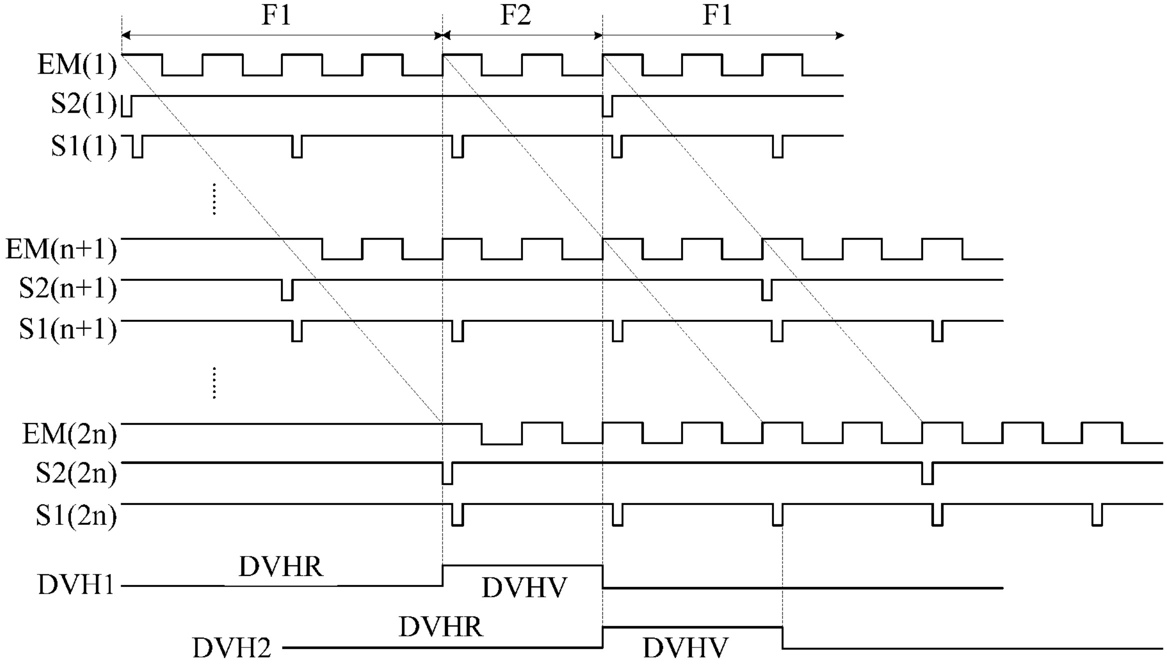
FIG. 5 is a drive timing diagram of a display panel according to an embodiment of the present invention.

FIG. 5 is a drive timing diagram of a display panel according to an embodiment of the present invention, which is applicable to driving each row of pixel circuits in the display panel shown in FIG. 3 to work. Referring to FIGS. 3 to 5, on the basis of each preceding embodiment, optionally, a display period of the display panel 100 includes a first display stage F1 and a second display stage F2. The first bias stage is located at the first display stage F1. The second bias stage is located at the second display stage F2. The first display stage F1 has i first bias stages, and the second display stage F2 has j second bias stages, where i and j are each an integer greater than or equal to 1.

Correspondingly, the bias signal line is configured to input the first bias voltage DVHR during a period from the start of the first display stage F1 of the first row of pixel circuits 10 in the corresponding display region to the end of the i-th first bias stage of the last row of pixel circuits 10 in the corresponding display region, and, input the second bias voltage DVHV during a period from the start of the second display stage F2 of the first row of pixel circuits 10 in the corresponding display region to the end of the j-th second bias stage of the last row of pixel circuits 10 in the corresponding display region.

Illustratively, the first display stage F1 is located before the second display stage F2 in the same display period as the first display stage F1. The first display stage F1 and the second display stage F2 each include at least one light emission stage and at least one non-light-emission stage. A first bias stage is located at a non-light-emission stage of the first display stage F1. A second bias stage is located at a non-light-emission stage of the second display stage F2.

The first bias signal line DVH1 is configured to input the first bias voltage DVHR during a period from the start of the first display stage F1 of the first row of pixel circuits 10 in the first display region AA1 to the end of the i-th first bias stage of the last row of pixel circuits 10 in the first display region AA1 and input the second bias voltage DVHV during a period from the start of the second display stage F2 of the first row of pixel circuits 10 in the first display region AA1 to the end of the j-th second bias stage of the last row of pixel circuits 10 in the first display region AA1. Each row of pixel circuits 10 in the first display region AA1 are scanned and driven sequentially. Moreover, i first bias stages of each row of pixel circuits 10 are performed sequentially, and first bias stages of various rows of pixel circuits 10 are performed sequentially. The first bias signal line DVH1 inputs the first bias voltage DVHR during a period from the start of the first display stage F1 of the first row of pixel circuits 10 in the first display region AA1 to the end of the i-th first bias stage of the last row of pixel circuits 10 in the first display region AA1 so that the bias modules 120 of each row of pixel circuits 10 in the first display region AA1 can adjust the bias states of the drive modules 110 through the first bias voltage DVHR at the first bias stages. Moreover, j second bias stages of each row of pixel circuits 10 are performed sequentially, and second bias stages of various rows of pixel circuits are performed sequentially. The first bias signal line DVH1 inputs the second bias voltage DVHV during a period from the start of the second display stage F2 of the first row of pixel circuits 10 in the first display region AA1 to the end of the j-th second bias stage of the last row of pixel circuits 10 in the first display region AA1 so that the bias modules 120 of each row of pixel circuits 10 in the first display region AA1 can adjust the bias states of the drive modules 110 through the second bias voltage DVHV at the second bias stages.

The second bias signal line DVH2 is configured to input the first bias voltage DVHR during a period from the start of the first display stage F1 of the first row of pixel circuits 10 in the second display region AA2 to the end of the i-th first bias stage of the last row of pixel circuits 10 in the second display region AA2 and input the second bias voltage DVHV during a period from the start of the second display stage F2 of the first row of pixel circuits 10 in the second display region AA2 to the end of the j-th second bias stage of the last row of pixel circuits 10 in the second display region AA2. Each row of pixel circuits 10 in the second display region AA2 are scanned and driven sequentially. Moreover, i first bias stages of each row of pixel circuits 10 are performed sequentially, and first bias stages of various rows of pixel circuits 10 are performed sequentially. The second bias signal line DVH2 inputs the first bias voltage DVHR during a period from the start of the first display stage F1 of the first row of pixel circuits 10 in the second display region AA2 to the end of the i-th first bias stage of the last row of pixel circuits 10 in the second display region AA2 so that the bias modules 120 of each row of pixel circuits 10 in the second display region AA2 can adjust the bias states of the drive modules 110 through the first bias voltage DVHR at the first bias stages. Moreover, j second bias stages of each row of pixel circuits 10 are performed sequentially, and second bias stages of various rows of pixel circuits 10 are performed sequentially. The second bias signal line DVH2 inputs the second bias voltage DVHV during a period from the start of the second display stage F2 of the first row of pixel circuits 10 in the second display region AA2 to the end of the j-th second bias stage of the last row of pixel circuits 10 in the second display region AA2 so that the bias modules 120 of each row of pixel circuits 10 in the second display region AA2 can adjust the bias states of the drive modules 110 through the second bias voltage DVHV at the second bias stages.

With this arrangement, the pixel circuits 10 in the first display region AA1 and the pixel circuits 10 in the second display region AA2 can adjust the bias states of the drive modules 110 through the first bias voltage DVHR at the first bias stages and can adjust the bias states of the drive modules 110 through the second bias voltage DVHV at the second bias stages so that the pixel circuits 10 in the first display region AA1 and the pixel circuits 10 in the second display region AA2 use the same bias voltage at the same bias stage and use different bias voltages at different bias stages, helping guarantee the bias effect of the drive modules 110 of the pixel circuits 10 in the first display region AA1 and the pixel circuits 10 in the second display region AA2 at different bias stages, enabling the drive modules 110 of the pixel circuits in the first display region AA1 and the pixel circuits 10 in the second display region AA2 to have a similar or even the same bias state at the same bias stage, contributing to balancing the display effect of the first display region AA1 and the display effect of the second display region AA2, and thereby alleviating the flicker and screen-splitting phenomena of the display panel 100.

Optionally, the first display stage F1 is a write frame. The second display stage F2 is a retention frame. The write frame is also referred to as "a refresh frame" or "a data frame". In the write frame, a voltage of a control terminal G of the drive module 110 is refreshed, and the drive module 110 generates a drive current according to the voltage of the control terminal G to drive the light-emitting element D1 to emit light. In the retention frame F2, the voltage of the control terminal G of the drive module 110 remains unchanged, and the drive module 110 can still generate the drive current according to the voltage of the control terminal G to drive the light-emitting element D1 to emit light. When the display panel performs display at a refresh frequency lower than a preset low frequency, frequency reduction is generally performed in the frame skip manner, that is, a retention frame is inserted after a write frame in each display period, and the duration of write frames at different refresh frequencies may be the same. The duration of the retention frame is adjusted so that the actual display effect meets a corresponding refresh frequency. Illustratively, as shown in FIG. 5, in this embodiment, the preset low frequency may be 60 Hz. On the basis of the preset low frequency of 60 Hz, the frequency reduction in the frame skip manner is performed in the long vertical (Long V) manner. The duration of the second display stage F2 is set to be half of the duration of the first display stage F1. That is, the duration of the retention frame is half of the duration of the write frame so that the actual display effect of the display panel meets the refresh frequency of 40 Hz.

In each embodiment below, by way of example, the first display stage F1 is a write frame, and the second display stage F2 is a retention frame.

Referring to FIGS. 3 to 5, optionally, a control terminal of the bias module 120 is connected with a first scan signal S1. The pixel circuit further includes a data write module 130, a compensation module 140, a storage module 150, and a light emission control module 160. The light emission control module 160, the drive module 110, and the light-emitting element D1 are connected between a first power line and a second power line. The first power line inputs a first power voltage PVDD. The second power line inputs a second power voltage PVEE. A control terminal of the data write module 130 is connected with a second scan signal S2. A control terminal of the compensation module 140 is connected with a third scan signal S3. A control terminal of the light emission control module 160 is connected with a light emission control signal EM.

Illustratively, the display panel 100 includes 2n rows of pixel circuits 10. The first row of pixel circuits 10 to the n-th row of pixel circuits 10 are located in the first display region AA1. The (n+1)-th row of pixel circuits 10 to the 2n-th row of pixel circuits 10 are located in the second display region AA2. For ease of differentiation, in FIG. 5, EM(k) denotes the light emission control signal EM input to the k-th row of pixel circuits 10. S1(*k*) denotes the first scan signal S1 input to the k-th row of pixel circuits 10. S2(*k*) denotes the second scan signal S2 input to the k-th row of pixel circuits 10. $1 \le k \le 2n$. FIG. 5 merely illustrates signals input to the first row of pixel circuits 10, the (n+1)-th pixel circuits 10, and the 2n-th pixel circuits 10. That is, a value of k is 1, n+1, and 2n. The working principle of pixel circuits 10 at the first display stage F1 and the second display stage F2 is described below by taking the first row of pixel circuits 10 for example. A turning-on level therein refers to a level for controlling a corresponding module to turn on. A cutoff level refers to a level for controlling a corresponding module to turn off. One of a turning-on level or a cutoff level for controlling the same module is a high level, and the other one is a low level. Turning-on levels for controlling different modules may be the same or opposite.

At the first display stage F1, when the light emission control signal EM(1) is at a cutoff level (for example, a high level), a turning-on level (for example, a low level) of the second scan signal S2(1) and a turning-on level of the first scan signal S1(1) arrive sequentially. The light emission control module 160 is turned off in response to the cutoff level of the light emission control signal EM(1). The data write module 130 is turned on in response to the turning-on level of the second scan signal S2(1). Moreover, the compensation module 140 is turned on in response to a turning-on level of a third scan signal S3 (not shown in FIG. 5). A data voltage Data is written into the control terminal G of the drive module 110 through the data write module 130, the drive module 110 and the compensation module 140, a threshold voltage of the drive module 110 is compensated through the compensation module 140, and the voltage of the control terminal G of the drive module 110 is stored through the storage module 150. Then the bias module 120 is turned on in response to the turning-on level of the first scan signal S1(1) and enters a first bias stage, the first bias voltage DVHR is transmitted to the first terminal of the drive module 110 through the bias module 120. The voltage of the first terminal of the drive module 110 is reset to adjust the bias state of the drive module 110 so that the drive module 110 is in the on-bias (OBS) state, thereby improving display uniformity. When the light emission control signal EM(1) changes from the cutoff level to a turning-on level, the first scan signal S1(1) and the second scan signal S2(1) are at cutoff levels, the bias module 120, the data write module 130 and the compensation module 140 all are turned off, and the light emission control module 160 is turned on. A discharge path is formed between the first power line and the second power line, and the drive module 110 generates a drive current according to the voltage of the control terminal G of the drive module 110 to drive the light-emitting element D1 to emit light with corresponding brightness.

At the second display stage F2, the voltage of the control terminal G of the drive module 110 remains unchanged. When the light emission control signal EM(1) is at a cutoff level, the turning-on level of the first scan signal S1(1) arrives, the bias module 120 is turned on in response to the turning-on level of the first scan signal S1(1) and enters a second bias stage, and the bias module 120 transmits the second bias voltage DVHV to the first end of the drive module 110. The voltage of the first end of the drive module 110 is reset to adjust the bias state of the drive module 110 so that the drive module 110 is in the OBS state, thereby improving display uniformity. When the light emission control signal EM(1) changes from the cutoff level to the turning-on level, the first scan signal S1(1) and the second scan signal S2(1) are at cutoff levels, the bias module 120, the data write module 130 and the compensation module 140 all are turned off, and the light emission control module 160 turns on. A discharge path is formed between the first power line and the second power line. The drive module 110 generates a drive current according to the voltage of the control terminal G of the drive module 110 to drive the light-emitting element D1 to emit light with corresponding brightness.

The working principle of other rows of pixel circuits 10 at the first display stage F1 and the second display stage F2 is similar to the working principle of the first row of pixel circuits 10 except that the scanning and driving time of each row of pixel circuits 10 is different. The details are not repeated here.

Referring to FIGS. 3 to 5, optionally, the first scan signal S1 includes i first turning-on levels located at the first display stage F1 and j second turning-on levels located at the second display stage F2. The bias module 120 is turned on at the first bias stages in response to the first turning-on levels in the first scan signal S1 and is turned on at the second bias stages in response to the second turning-on levels in the first scan signal S1.

Correspondingly, the bias signal line is configured to input the first bias voltage DVHR during a period from the start of the first one of the first turning-on levels of the first scan signal S1 connected to the first row of pixel circuits 10 in the corresponding display region to the end of the i-th one of the first turning-on levels of the first scan signal S1 connected to the last row of pixel circuits 10 in the corresponding display region, and input the second bias voltage DVHV during a period from the start of the first one of the second turning-on levels of the first scan signal S1 connected to the first row of pixel circuits 10 in the corresponding display region to the end of the j-th one of second turning-on levels of the first scan signal S1 connected to the last row of pixel circuits 10 in the corresponding display region.

Specifically, the first turning-on levels and the second turning-on levels are levels that control the bias module 120 to be turned on. The first display stage F1 has i first bias stages. The second display stage F2 has j second bias stages. In this case, each first turning-on level in the first scan signal S1 arrives at one first bias stage. Each second turning-on level arrives at one second bias stage.

Illustratively, the display panel 100 includes 2n rows of pixel circuits 10. The first row of pixel circuits 10 to the n-th row of pixel circuits 10 are located in the first display region AA1. The (n+1)-th row of pixel circuits 10 to the 2n-th row of pixel circuits 10 are located in the second display region AA2. The first bias signal line DVH1 is configured to input the first bias voltage DVHR during a period from the start of the first one of the first turning-on levels of the first scan signal S1 connected to the first row of pixel circuits 10 to the end of the i-th one of the first turning-on levels of the first scan signal S1 connected to the n-th row of pixel circuits 10, and input the second bias voltage DVHV during a period from the start of the first one of the second turning-on levels of the first scan signal S1 connected to the first row of pixel circuits 10 to the end of the j-th one of the second turning-on levels of the first scan signal S1 connected to the n-th row of pixel circuits 10. The second bias signal line DVH2 is configured to input the first bias voltage DVHR during a period from the start of the first one of the first turning-on levels of the first scan signal S1 connected to the (n+1)-th row of pixel circuits 10 to the end of the i-th one of the first turning-on levels of the first scan signal S1 connected to the 2n-th row of pixel circuits 10, and input the second bias voltage DVHV during a period from the start of the first one of the second turning-on levels of the first scan signal S1 connected to the (n+1)-th row of pixel circuits 10 to the end of the j-th one of the second turning-on levels of the first scan signal S1 connected to the 2n-th row of pixel circuits 10.

Referring to FIGS. 3 to 5, optionally, in an embodiment, when the working stage of the first row of pixel circuits 10 enters the second display stage F2, part of the pixel circuits 10 in the second display region AA2 already enters a first bias stage. In this case, the voltage input from the first bias signal line DVH1 corresponding to the first display region AA1 changes from the first bias voltage DVHR to the second bias voltage DVHV so that the pixel circuits 10 in the first display region AA1 adjust the bias states of the drive modules 110 at the second bias stages of the second display stage F2. At the same time, each row of pixel circuits 10 in the second display region AA2 still work at the first display stage F1, and the second bias signal line DVH2 corresponding to the second display region AA2 still inputs the first bias voltage DVHR. When the second display stage F2 of the first row of pixel circuits 10 ends, the voltage input from the first bias signal line DVH1 changes from the second bias voltage DVHV to the first bias voltage DVHR for the application of the pixel circuits 10 in the first display region AA1 at the first display stage F1 in the next display period. At the same time, the (n+1)-th row of pixel circuits enter the second display stage F2, and the voltage input from the second bias signal line DVH2 corresponding to the second display region AA2 changes from the first bias voltage DVHR to the second bias voltage DVHV so that the pixel circuits 10 in the second display region AA2 adjust the bias states of the drive modules 110 at the second bias stages of the second display stage F2.

As mentioned above, in at least part of turning-on stages of the bias module 120, the first bias signal line DVH1 and the second bias signal line DVH2 transmit different voltages. Referring to FIGS. 3 to 5, in this embodiment, in at least part of second bias stages where the bias modules 120 of the first row of pixel circuits 10 in the first display region AA1 work, the first bias signal line DVH1 and the second bias signal line DVH2 transmit different voltages. Moreover, in at least part of second bias stages where the bias modules 120 of the first row of pixel circuits 10 (that is, the (n+1)-th row of pixel circuits 10 of the display panel) in the second display region AA2 work, the first bias signal line DVH1 and the second bias signal line DVH2 transmit different voltages.

Referring to FIGS. 3 to 5, optionally, when i=2, the display region of the display panel 100 is divided into the first display region AA1 and the second display region AA2. That is, the number of display regions divided from the display panel 100 is related to the number i of first bias stages at the first display stage F1, that is, related to the number of first turning-on levels at the first display stage F1.

Specifically, the magnitude of i and the magnitude of j are related to the current refresh frequency of the display panel. Illustratively, the light emission control signal EM in each display period at the preset low frequency includes 2m level groups. One turning-on level and one cutoff level that are continuous are one level group. When the current refresh frequency of the display panel is lower than the preset low frequency, each display period includes a first display stage F1 and a second display stage F2. The light emission control signal EM at the first display stage F1 includes 2m level groups, and m is an integer greater than or equal to 1. On the basis of the first display stage F1, the number of level groups in the light-emission control signal EM is increased in the Long V manner, that is, the second display stage F2 is inserted after the first display stage F1. The number of level groups of the light emission control signal EM at the second display stage F2 is set according to the current refresh frequency of the display panel. For example, referring to FIG. 5, when the preset low frequency is 60 Hz, the light emission control signal EM at the first display stage F1 may include four level groups. When the current refresh frequency of the display panel is 40 Hz, the light emission control signal EM at the second display stage F2 may be set to include two level groups so that the actual display effect of the display panel meets the refresh frequency of 40 Hz. In this case, the first display stage F1 and the second display stage F2 are each provided with at least one bias stage. To guarantee that intervals between two adjacent turning-on levels in the first scan signal S1 are equal, the first display stage F1 may be provided with two first bias stages, and the second display stage F2 may be provided with one second bias stage. That is, the first scan signal S1 includes two first turning-on levels located at the first display stage F1 and one second turning-on level located at the second display stage F2, i=2. j=1. Moreover, each interval between two adjacent turning-on levels in the first scan signal S1 is a duration corresponding to two level groups of the light emission control signal EM. On this basis, the display region of the display panel 100 is divided into two parts according to the i value, namely, the first display region AA1 and the second display region AA2. The first bias signal line DVH1 is provided corresponding to the first display region AA1. The second bias signal line DVH2 is provided corresponding to the second display region AA2.

Referring to FIGS. 3 to 5, optionally, the row number of pixel circuits 10 in the first display region AA1 and the row number of pixel circuits 10 in the second display region AA2 is calculated as that p=(q/t)+1. And p denotes the row number of pixel circuits 10 in a corresponding display region, q denotes an interval between the first one of the first turning-on levels of the first scan signal S1 connected to the first row of pixel circuits 10 in the corresponding display region and the first one of the first turning-on levels of the first scan signal S1 connected to the last row of pixel circuits 10 in the corresponding display region, and t denotes a scan time interval between two adjacent rows of pixel circuits 10 in the corresponding display region.

Illustratively, q1 denotes an interval between the first one of the first turning-on levels of the first scan signal S1 connected to the first row of pixel circuits 10 in the first display region AA1 and the first one of the first turning-on levels of the first scan signal S1 connected to the last row of pixel circuits 10 in the first display region AA1, t1 denotes a scan time interval between two adjacent rows of pixel circuits 10 in the first display region AA1. In this case, the row number of pixel circuits 10 in the first display region AA1 is calculated as that p1=(q1/t1)+1. Illustratively, q2 denotes an interval between the first one of the first turning-on levels of the first scan signal S1 connected to the first row of pixel circuits 10 in the second display region AA2 and the first one of the first turning-on levels of the first scan signal S1 connected to the last row of pixel circuits 10 in the second display region AA2, t2 denotes a scan time interval between two adjacent rows of pixel circuits 10 in the second display region AA2. In this case, the row number of pixel circuits 10 in the second display region AA2 is calculated as that p2=(q2/t2)+1. In general, t1=t2.

It is to be noted that in each preceding embodiment, by way of example, the display region of the display panel is divided into the first display region AA1 and the second display region AA2. Each row of pixel circuits 10 in the first display region AA1 are connected to the first bias signal line DVH1. Each row of pixel circuits 10 in the second display region AA2 are connected to the second bias signal line DVH2. In practical application, the division of the display area is not limited thereto. In some embodiments, at least two rows of pixel circuits 10 of one of the display regions may be configured to be connected to different bias signal lines according to needs. No special limitations are made to the preceding content in this embodiment of the present invention.

Figure 6:
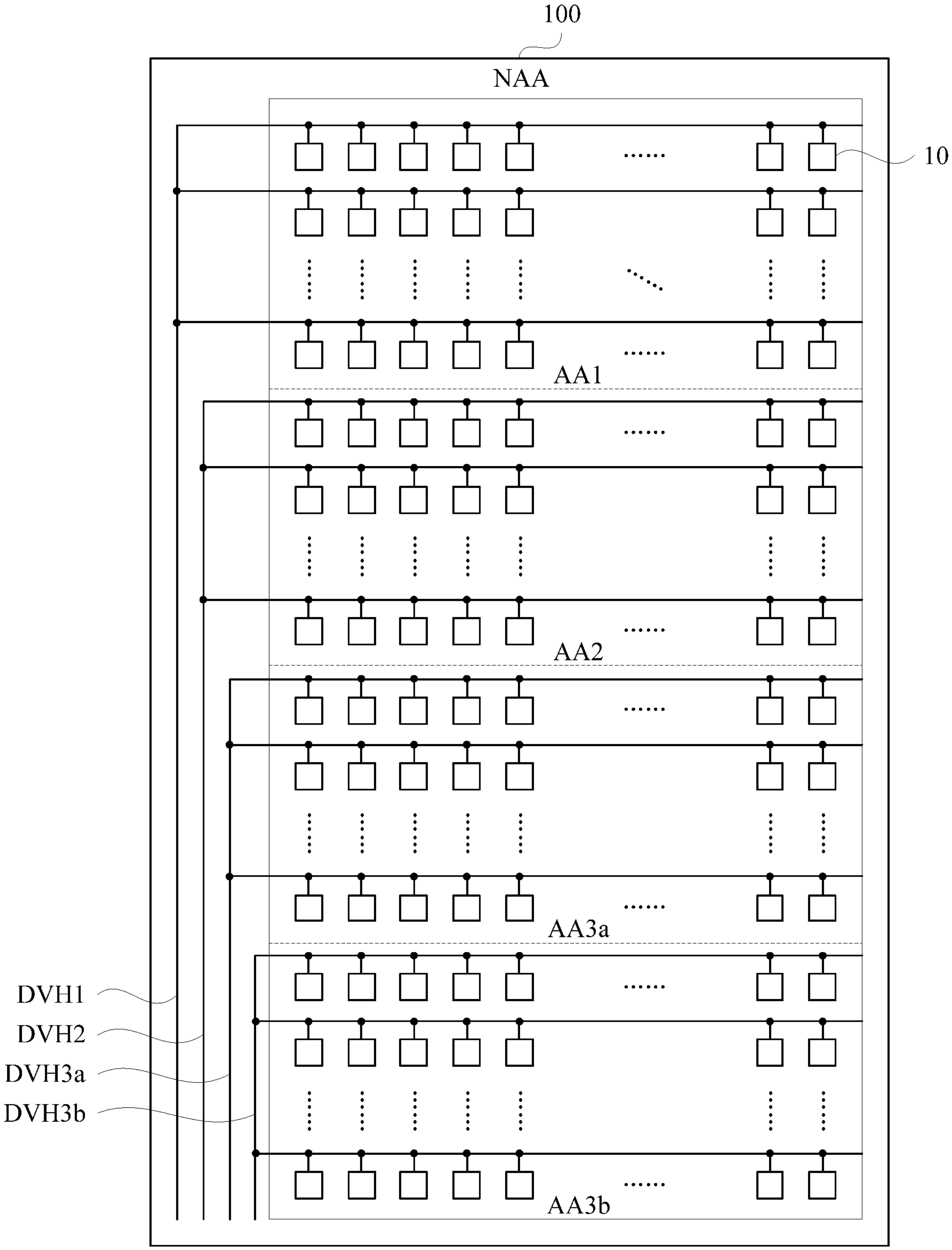
FIG. 6 is another structural diagram of a display panel according to an embodiment of the present invention.
Figure 7:
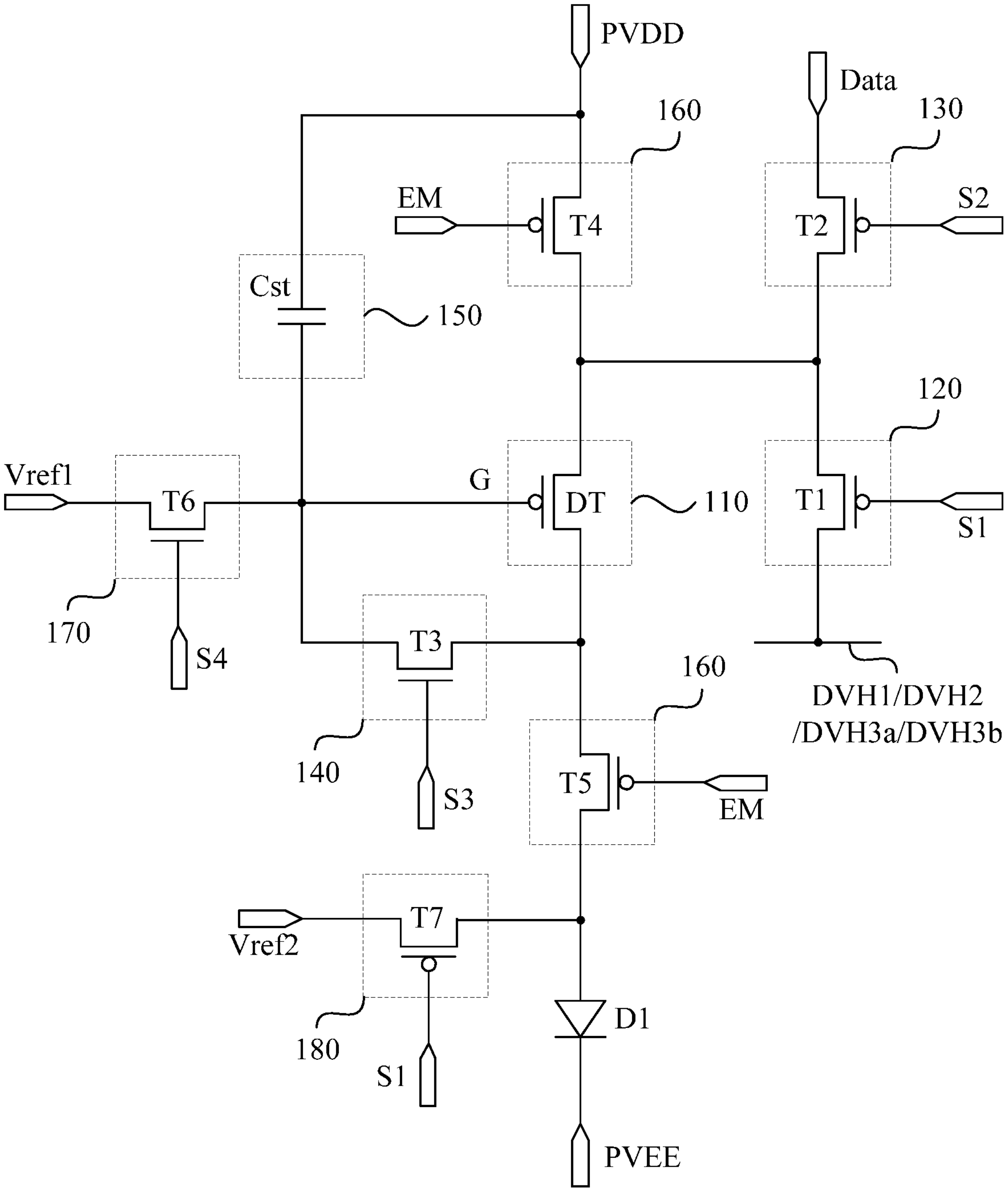
FIG. 7 is another structural diagram of a pixel circuit according to an embodiment of the present invention.

FIG. 6 is another structural diagram of a display panel according to an embodiment of the present invention. FIG. 7 is another structural diagram of a pixel circuit according to an embodiment of the present invention. Referring to FIGS. 6 and 7, on the basis of each preceding embodiment, optionally, the display region of the display panel 100 further includes at least one third display region. A third display region includes at least one row of pixel circuits 10. The bias signal lines further include at least one third bias signal line. The at least one third bias signal line corresponds to the at least one third display region. Illustratively, the at least one third bias signal line corresponds to the at least one third display region in a one-to-one manner. Bias modules 120 in the third display region are connected to a corresponding third bias signal line. In at least part of turning-on stages of bias modules 120, voltages transmitted by bias signal lines corresponding to any two consecutive display regions among the first display region AA1, the second display region AA2 and the third display region are different.

Specifically, the third display region may be any display region other than the first display region AA1 and the second display region AA2 in the display panel 100. The third display region includes at least one row of pixel circuits 10. By way of example, two third display regions are provided. Illustratively, the third display regions include a third display region AA3*a* and a third display region AA3*b*. The bias signal lines further include a third bias signal line DVH3*a* and a third bias signal line DVH3*b*. Bias modules 120 of each row of pixel circuits 10 in the third display region AA3*a* are each connected to the third bias signal line DVH3*a*. Bias modules 120 of each row of pixel circuits 10 in the third display region AA3*b* are each connected to the third bias signal line DVH3*b*. The third bias signal line DVH3*a* is configured to input the first bias voltage at a first bias stage of each row of pixel circuits 10 in the third display region AA3*a* and input the second bias voltage at a second bias stage of each row of pixel circuits 10 in the third display region AA3*a*. The third bias signal line DVH3*b* is configured to input the first bias voltage at a first bias stage of each row of pixel circuits 10 in the third display region AA3*b* and input the second bias voltage at a second bias stage of each row of pixel circuits 10 in the third display region AA3*b*.

With this arrangement, the pixel circuits 10 in the first display region AA1, the pixel circuits 10 in the second display region AA2, the pixel circuits 10 in the third display region AA3*a*, and the pixel circuits 10 in the third display region AA3*b* can adjust the bias states of the drive modules 110 through the first bias voltage at the first bias stages and can adjust the bias states of the drive modules 110 through the second bias voltage at the second bias stages so that the pixel circuits 10 in the first display region AA1, the pixel circuits 10 in the second display region AA2, the pixel circuits 10 in the third display region AA3*a*, and the pixel circuits 10 in the third display region AA3*b* use the same bias voltage at the same bias stage and different bias voltages at different bias stages, helping guarantee the bias effect of the drive modules 110 of the pixel circuits 10 in the first display region AA1, the pixel circuits 10 in the second display region AA2, the pixel circuits 10 in the third display region AA3*a*, and the pixel circuits 10 in the third display region AA3*b* at different bias stages, enabling the drive modules 110 of the pixel circuits 10 in the first display region AA1, the pixel circuits 10 in the second display region AA2, the pixel circuits 10 in the third display region AA3*a*, and the pixel circuits 10 in the third display region AA3*b* to have a similar or even the same bias state at the same bias stage, contributing to balancing the display effect of the first display region AA1, the display effect of the second display region AA2, the display effect of the third display region AA3*a*, and the display effect of the third display region AA3*b*, and thereby alleviating the flicker and screen-splitting phenomena of the display panel 100.

Optionally, in an embodiment, the first display region AA1, the second display region AA2, and the at least one third display region are adjacent sequentially. In the case where more than one third display region is provided, the more than one third display region is adjacent sequentially. For example, the display panel is divided into the first display region AA1, the second display region AA2, the third display region AA3*a*, and the third display region AA3*b*. The first display region AA1, the second display region AA2, the third display region AA3*a*, and the third display region AA3*b* are adjacent sequentially. In this case, corresponding bias voltages are supplied to the first display region AA1, the second display region AA2, the third display region AA3*a*, and the third display region AA3*b* through corresponding bias signal lines, helping improve the bias effect of each region in the display region at different bias stages, helping make each region have a similar or the same bias state at the same bias stage so as to balance the display effect of each region, and thereby alleviating the flicker and screen-splitting phenomena of the display panel 100.

In other embodiments, any two of the first display region AA1, the second display region AA2, and the at least one third display region may also be spaced apart. For example, at least one row of pixel circuits 10 may be provided between any two of the first display region AA1, the second display region AA2, the third display region AA3*a*, and the third display region AA3*b*. The first display region AA1, the second display region AA2, and the at least one third display region may merely occupy part of the display region of the display panel 100. Alternatively, the first display region AA1, the second display region AA2, and the at least one third display region may constitute the entire display region of the display panel 100.

Figure 8:
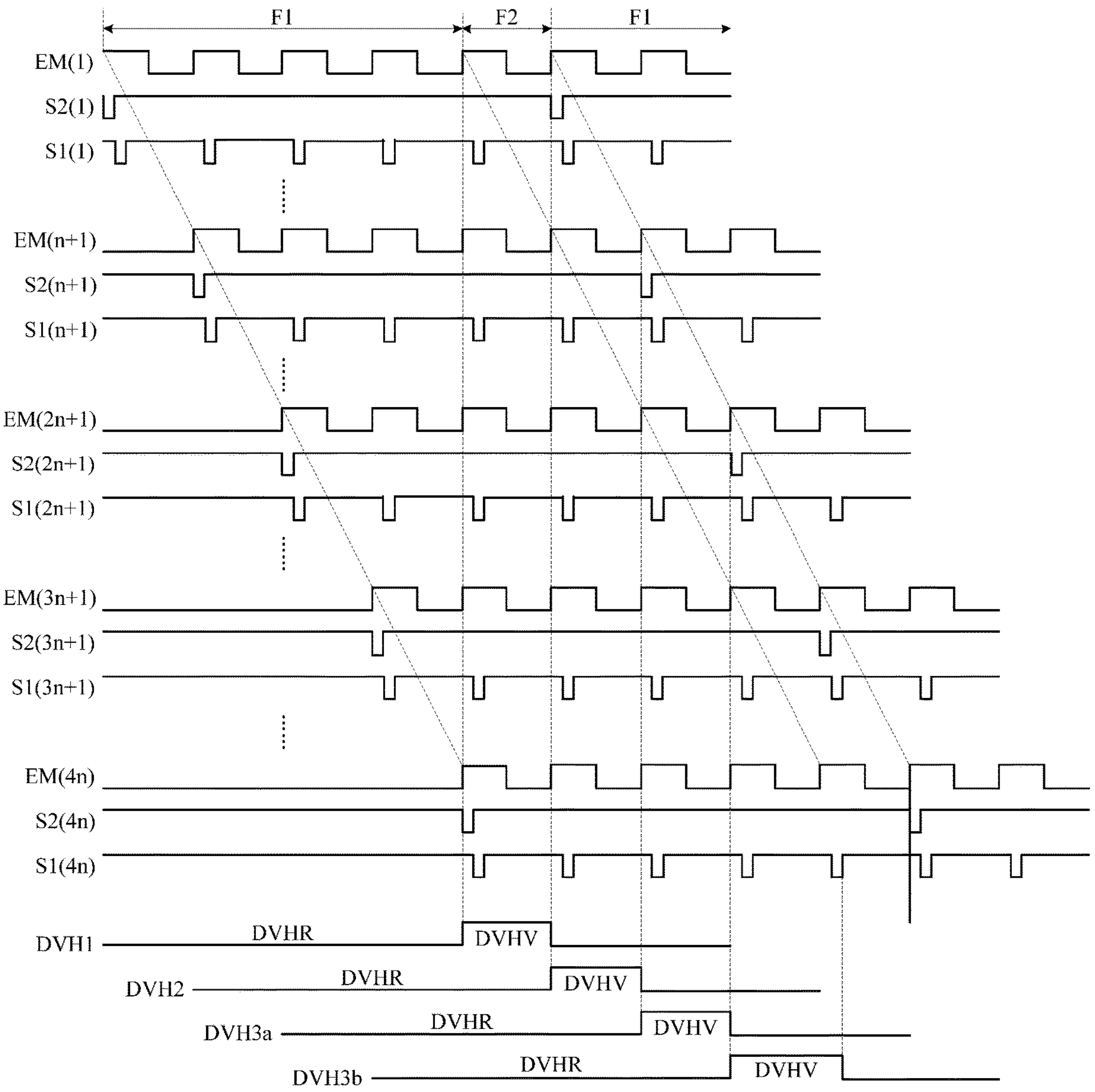
FIG. 8 is a drive timing diagram of a display panel according to an embodiment of the present invention.

FIG. 8 is a drive timing diagram of a display panel according to an embodiment of the present invention, which is applicable to driving each row of pixel circuits in the display panel shown in FIG. 6 to work. Referring to FIGS. 6 to 8, on the basis of each preceding embodiment, optionally, the third bias signal line DVH3*a* is configured to input the first bias voltage DVHR during a period from the start of the first display stage F1 of the first row of pixel circuits 10 in the third display region AA3*a* to the end of the i-th first bias stage of the last row of pixel circuits 10 in the third display region AA3*a* and input the second bias voltage DVHV during a period from the start of the second display stage F2 of the first row of pixel circuits 10 in the third display region AA3*a* to the end of the j-th second bias stage of the last row of pixel circuits in the third display region AA3*a*. The third bias signal line DVH3*b* is configured to input the first bias voltage DVHR during a period from the start of the first display stage F1 of the first row of pixel circuits 10 in the third display region AA3*b* to the end of the i-th first bias stage of the last row of pixel circuits 10 in the third display region AA3*b* and input the second bias voltage DVHV during a period from the start of the second display stage F2 of the first row of pixel circuits 10 in the third display region AA3*b* to the end of the j-th second bias stage of the last row of pixel circuits 10 in the third display region AA3*b*.

In each embodiment below, by way of example, the first display stage F1 is still a write frame, and the second display stage F2 is still a retention frame.

Referring to FIGS. 6 to 8, illustratively, the display panel 100 includes 4n rows of pixel circuits 10. The first row of pixel circuits 10 to the n-th row of pixel circuits 10 are located in the first display region AA1. The (n+1)-th row of pixel circuits 10 to the 2n-th row of pixel circuits 10 are located in the second display region AA2. The (2n+1)-th row of pixel circuits 10 to the 3n-th row of pixel circuits 10 are located in the third display region AA3*a*. The (3n+1)-th row of pixel circuits 10 to the 4n-th row of pixel circuits 10 are located in the third display region AA3*b*. For ease of differentiation, in FIG. 8, EM(k) denotes the light emission control signal EM input to the k-th row of pixel circuits 10. S1(*k*) denotes the first scan signal S1 input to the k-th row of pixel circuits 10. S2(*k*) denotes the second scan signal S2 input to the k-th row of pixel circuits 10. $1 \le k \le 4n$. FIG. 8 merely illustrates signals input to the first row of pixel circuits 10, the (n+1)-th pixel circuits 10, the (2n+1)-th pixel circuits 10, the (3n+1)-th pixel circuits 10, and the 4n-th pixel circuits 10. That is, the k value is 1, n+1, 2n+1, 3n+1, and 4n.

Correspondingly, the first bias signal line DVH1 is configured to input the first bias voltage DVHR during a period from the start of the first one of the first turning-on levels of the first scan signal S1 connected to the first row of pixel circuits 10 to the end of the i-th one of the first turning-on levels of the first scan signal S1 connected to the n-th row of pixel circuits 10 and input the second bias voltage DVHV during a period from the start of the first one of the second turning-on levels of the first scan signal S1 connected to the first row of pixel circuits 10 to the end of the j-th one of the second turning-on levels of the first scan signal S1 connected to the n-th row of pixel circuits 10.

The second bias signal line DVH2 is configured to input the first bias voltage DVHR during a period from the start of the first one of the first turning-on levels of the first scan signal S1 connected to the (n+1)-th row of pixel circuits 10 to the end of the i-th one of the first turning-on levels of the first scan signal S1 connected to the 2n-th row of pixel circuits 10 and input the second bias voltage DVHV during a period from the start of the first one of the second turning-on levels of the first scan signal S1 connected to the (n+1)-th row of pixel circuits 10 to the end of the j-th one of the second turning-on levels of the first scan signal S1 connected to the 2n-th row of pixel circuits 10.

The second bias signal line DVH3*a* is configured to input the first bias voltage DVHR during a period from the start of the first one of the first turning-on levels of the first scan signal S1 connected to the (2n+1)-th row of pixel circuits 10 to the end of the i-th one of the first turning-on levels of the first scan signal S1 connected to the 3n-th row of pixel circuits 10 and input the second bias voltage DVHV during a period from the start of the first one of the second turning-on levels of the first scan signal S1 connected to the (2n+1)-th row of pixel circuits 10 to the end of the j-th one of the second turning-on levels of the first scan signal S1 connected to the 3n-th row of pixel circuits 10.

The third bias signal line DVH3*b* is configured to input the first bias voltage DVHR during a period from the start of the first one of the first turning-on levels of the first scan signal S1 connected to the (3n+1)-th row of pixel circuits 10 to the end of the i-th one of the first turning-on levels of the first scan signal S1 connected to the 4n-th row of pixel circuits 10 and input the second bias voltage DVHV during a period from the start of the first one of the second turning-on levels of the first scan signal S1 connected to the (3n+1)-th row of pixel circuits 10 to the end of the j-th one of the second turning-on levels of the first scan signal S1 connected to the 4n-th row of pixel circuits 10.

Referring to FIGS. 6 to 8, in at least part of turning-on stages of the bias module 120, the first bias signal line DVH1 and the second bias signal line DVH2 transmit different voltages, the second bias signal line DVH2 and the third bias signal line DVH3*a* transmit different voltages, and the third bias signal line DVH3*a* and the third bias signal line DVH3*b* transmit different voltages.

Specifically, when the first display region AA1, the second display region AA2, the third display region AA3*a*, and the third display region AA3*b* are adjacent sequentially, in at least part of turning-on stages of the bias module 120, the first bias signal line DVH1 and the second bias signal line DVH2 transmit different voltages. For example, in at least part of second bias stages where the bias modules 120 of the first row of pixel circuits 10 in the first display region AA1 work, the first bias signal line DVH1 and the second bias signal line DVH2 transmit different voltages. Moreover, in at least part of second bias stages where the bias modules 120 of the first row of pixel circuits 10 (that is, the (n+1)-th row of pixel circuits 10 of the display panel) in the second display region AA2 work, the first bias signal line DVH1 and the second bias signal line DVH2 transmit different voltages.

In at least part of turning-on stages of the bias module 120, the second bias signal line DVH2 and the third bias signal line DVH3*a* transmit different voltages. For example, in at least part of second bias stages where the bias modules 120 of the first row of pixel circuits 10 (that is, the (n+1)-th row of pixel circuits 10 of the display panel) in the second display region AA2 work, the second bias signal line DVH2 and the third bias signal line DVH3*a* transmit different voltages. Moreover, in at least part of second bias stages where the bias modules 120 of the first row of pixel circuits 10 (that is, the (2n+1)-th row of pixel circuits 10 of the display panel) in the third display region AA3*a* work, the second bias signal line DVH2 and the third bias signal line DVH3*a* transmit different voltages.

In at least part of turning-on stages of the bias module 120, the third bias signal line DVH3*a* and the third bias signal line DVH3*b* transmit different voltages. For example, in at least part of second bias stages where the bias modules 120 of the first row of pixel circuits 10 (that is, the (2n+1)-th row of pixel circuits 10 of the display panel) in the third display region AA3*a* work, the third bias signal line DVH3*a* and the third bias signal line DVH3*b* transmit different voltages. Moreover, in at least part of second bias stages where the bias modules 120 of the first row of pixel circuits 10 (that is, the (3n+1)-th row of pixel circuits 10 of the display panel) in the third display region AA3*b* work, the third bias signal line DVH3*a* and the third bias signal line DVH3*b* transmit different voltages.

Referring to FIGS. 6 to 8, optionally, in the case where the display region further includes the at least one third display region AA3, the total number of the first display region AA1, the second display region AA2, and the at least one third display region AA3 is equal to i.

Illustratively, in the case where the current refresh frequency of the display panel is lower than the preset low frequency of 60 Hz, the light emission control signal EM at the first display stage F1 includes four level groups, and the light emission control signal EM at the second display stage F2 includes two level groups. In this case, the first display stage F1 and the second display stage F2 are each provided with at least one bias stage. To guarantee that intervals between two adjacent turning-on levels in the first scan signal S1 are equal, the first display stage F1 may be provided with four first bias stages, and the second display stage F2 may be provided with one second bias stage. That is, the first scan signal S1 includes four first turning-on levels located at the first display stage F1 and one second turning-on level located at the second display stage F2, and i=4. j=1. Moreover, each interval between two adjacent turning-on levels in the first scan signal S1 is a duration corresponding to one level group of the light emission control signal EM. On this basis, the display region of the display panel 100 is divided into four parts according to the i value, namely, the first display region AA1, the second display region AA2, the third display region AA3*a*, and the third display region AA3*b*. The first bias signal line DVH1 is provided corresponding to the first display region AA1. The second bias signal line DVH2 is provided corresponding to the second display region AA2. The third bias signal line DVH3*a* is provided corresponding to the third display region AA3*a*. The third bias signal line DVH3*b* is provided corresponding to the third display region AA3*b*.

Referring to FIGS. 6 to 8, optionally, the row number of pixel circuits 10 in any one of the first display region AA1, the second display region AA2, the third display region AA3*a*, or the third display region AA3*b* is calculated as that p=(q/t)+1.

Illustratively, q1 denotes an interval between the first one of the first turning-on levels of the first scan signal S1 connected to the first row of pixel circuits 10 in the first display region AA1 and the first one of the first turning-on levels of the first scan signal S1 connected to the last row of pixel circuits 10 in the first display region AA1, and t1 denotes a scan time interval between two adjacent rows of pixel circuits 10 in the first display region AA1. In this case, the row number of pixel circuits 10 in the first display region AA1 is calculated as that p1=(q1/t1)+1. Illustratively, q2 denotes an interval between the first one of the first turning-on levels of the first scan signal S1 connected to the first row of pixel circuits 10 in the second display region AA2 and the first one of the first turning-on levels of the first scan signal S1 connected to the last row of pixel circuits 10 in the second display region AA2, and t2 denotes a scan time interval between two adjacent rows of pixel circuits 10 in the second display region AA2. In this case, the row number of pixel circuits 10 in the second display region AA2 is calculated as that p2=(q2/t2)+1. Illustratively, q3 denotes an interval between the first one of the first turning-on levels of the first scan signal S1 connected to the first row of pixel circuits in the third display region AA3*a* and the first one of the first turning-on levels of the first scan signal S1 connected to the last row of pixel circuits 10 in the third display region AA3*a*, and t3 denotes a scan time interval between two adjacent rows of pixel circuits 10 in the third display region AA3*a*. In this case, the row number of pixel circuits 10 in the third display region AA3*a* is calculated as that p3=(q3/t3)+1. Illustratively, q4 denotes an interval between the first one of the first turning-on levels of the first scan signal S1 connected to the first row of pixel circuits 10 in the third display region AA3*b* and the first one of the first turning-on levels of the first scan signal S1 connected to the last row of pixel circuits 10 in the third display region AA3*b*, and t4 denotes a scan time interval between two adjacent rows of pixel circuits 10 in the third display region AA3*b*. In this case, the row number of pixel circuits 10 in the third display region AA3*b* is calculated as that p4=(q4/t4)+1. In general, t1=t2=t3=t4.

For the display panel shown in FIG. 3, when the first scan signal S1 input to each row of pixel circuits 10 includes two first turning-on levels located at the first display stage F1, that is, i=2. On this basis, the display region of the display panel 100 is divided into two parts, and two corresponding bias signal lines are provided. For the display panel shown in FIG. 6, when the first scan signal S1 input to each row of pixel circuits 10 includes four first turning-on levels located at the first display stage F1, that is, i=4. On this basis, the display region of the display panel 100 is divided into four parts, and four corresponding bias signal lines are provided. It is to be understood that, in other embodiments, when i is another numerical value, the display region of the display panel 100 may be divided into i parts, and i corresponding bias signal lines are provided. For the specific manner of supplying a voltage to a bias signal line corresponding to each display region, reference may be made to each preceding embodiment. The details are not repeated here.

Referring to FIG. 7, optionally, the pixel circuit application to each embodiment of the present invention further includes a first initialization module 170 and a second initialization module 180. A control terminal of the first initialization module 170 is connected with a fourth scan signal S4. A first terminal of the first initialization module 170 accesses a first initialization voltage Vref1. A second terminal of the first initialization module 170 is connected to the control terminal G of the drive module 110. In response to a turning-on level in the fourth scan signal S4, the first initialization module 170 writes the first initialization voltage Vref1 to the control terminal G of the drive module 110 at an initialization stage of the first display stage. A control terminal of the second initialization module 180 is connected with the first scan signal S1. A first terminal of the second initialization module 180 accesses a second initialization voltage Vref2. A second terminal of the second initialization module 180 is connected to a first pole of the light-emitting element D1. In response to a turning-on level in the first scan signal S1, the second initialization module 180 writes the second initialization voltage Vref2 to the first pole of the light-emitting element D1. The magnitude of the first initialization voltage Vref1 may be the same as or different from the magnitude of the second initialization voltage Vref2.

Further, the drive module 110 includes a drive transistor DT. The bias module 120 includes a first transistor T1. The data write module 130 includes a second transistor T2. The threshold compensation module 140 includes a third transistor T3. The light emission control module 160 includes a fourth transistor T4 and a fifth transistor T5. The first initialization module 170 includes a sixth transistor T6. The second initialization module 180 includes a seventh transistor T7. The storage module 150 includes a storage capacitor Cst. A gate of the first transistor T1 accesses the first scan signal S1. A first pole of the first transistor T1 is connected to the corresponding bias signal line. A second pole of the first transistor T1 is connected to a first pole of the drive transistor DT. A gate of the second transistor T2 accesses the second scan signal S2. A first pole of the second transistor T2 accesses the data voltage Data. A second pole of the second transistor T2 is connected to the first pole of the drive transistor DT. A gate of the third transistor T3 accesses the third scan signal. The third transistor T3 is connected between a second pole of the drive transistor DT and a gate of the drive transistor DT. A gate of the fourth transistor T4 and a gate of the fifth transistor T5 each access the light emission control signal EM. The fourth transistor T4 is connected between the first power line and the first pole of the drive transistor DT. The fifth transistor T5 is connected between the second pole of the drive transistor DT and the first pole of the light-emitting element D1. A second pole of the light-emitting element D1 is connected to the second power line. A gate of the sixth transistor T6 accesses the fourth scan signal S4. A first pole of the sixth transistor T6 accesses the first initialization voltage Vref1. A second pole of the sixth transistor T6 is connected to the gate of the drive transistor DT. A gate of the seventh transistor T7 accesses the first scan signal S1. A first pole of the seventh transistor T7 accesses the second initialization voltage Vref2. A second pole of the seventh transistor T7 is connected to the first pole of the light-emitting element D1. A first pole of the storage capacitor Cst is connected to the gate of the drive transistor DT. A second pole of the storage capacitor Cst accesses a fixed voltage. For example, the second pole of the storage capacitor Cst is connected to the first power line so as to access the first power voltage PVDD. As shown in FIG. 7, the sixth transistor T6 and the third transistor T3 are n-type transistors. Other transistors are p-type transistors. It is to be noted that the present invention is not limited thereto. A transistor in the pixel circuit may be selected to be an n-type transistor or a p-type transistor according to specific situations.

Figure 9:
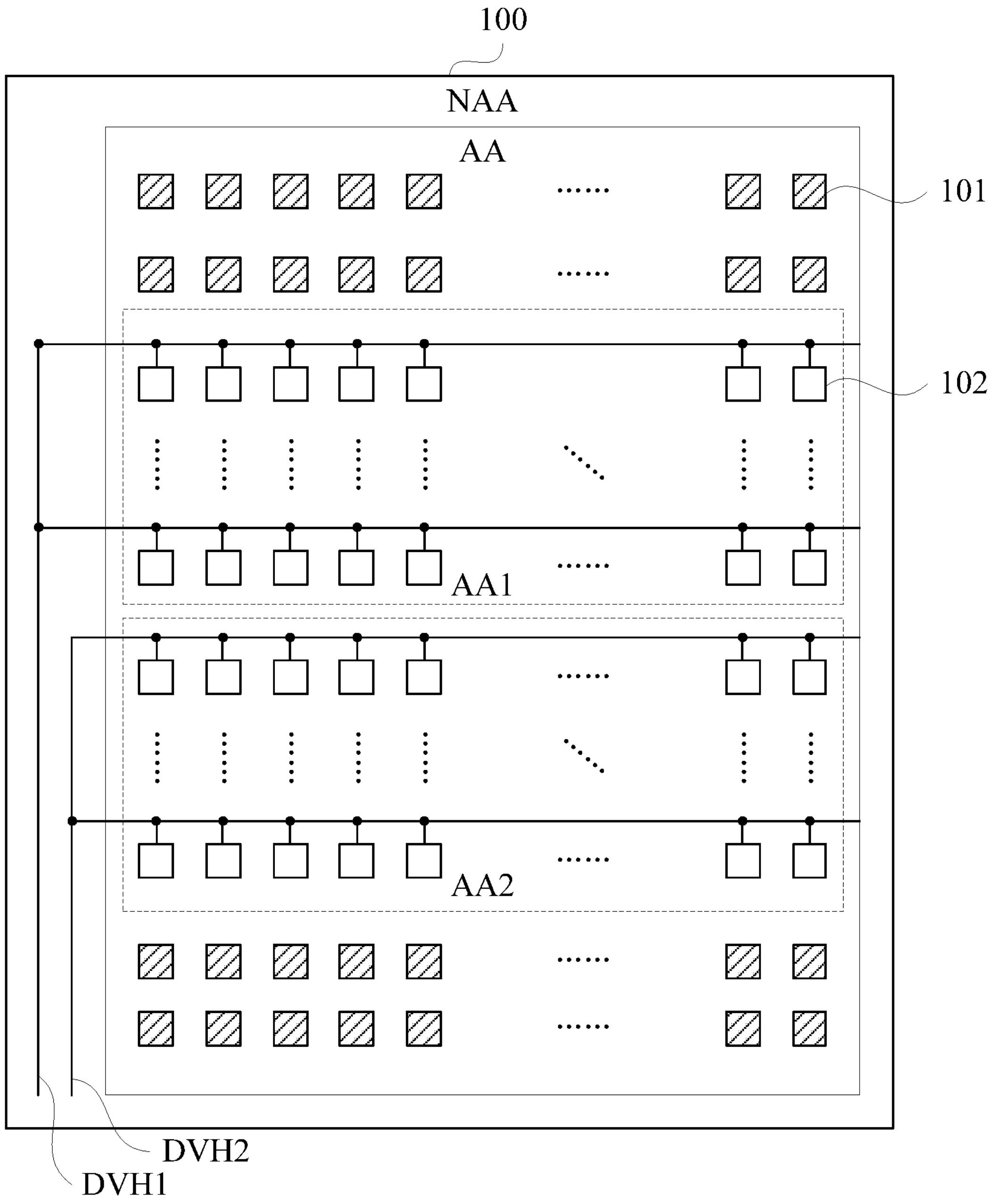
FIG. 9 is another structural diagram of a display panel according to an embodiment of the present invention.

FIG. 9 is another structural diagram of a display panel according to an embodiment of the present invention. Referring to FIG. 9, on the basis of each preceding embodiment, the pixel circuits in the display panel include first pixel circuits 101 and second pixel circuits 102. The first pixel circuits 101 and the second pixel circuits 102 have the same structure. The first pixel circuits 101 are dummy pixel circuits.

Illustratively, the first pixel circuits 101 and the second pixel circuits 102 may be each located in the display region AA. The structure of a first pixel circuit 101 and the structure of a second pixel circuit 102 may be the same as the structure of the pixel circuit shown in FIG. 4 or the structure of the pixel circuit shown in FIG. 7, with the difference lying in that the first pixel circuit 101 is not used for driving a light-emitting element D1. Illustratively, a rows of first pixel circuits 101 are located before each row of second pixel circuits 102 to form a "front porch" of the display panel and/or, b rows of first pixel circuits 101 are located after each row of second pixel circuits 102 to form a "back porch" of the display panel, where a and b are each an integer greater than or equal to 1.

Referring to FIG. 9, in an embodiment, any one of the first display region AA1 or the second display region AA2 includes second pixel circuits 102. That is, the pixel circuits in the first display region AA1 and the pixel circuits in the second display region AA2 may be second pixel circuits 102. In this case, the row number of pixel circuits in the first display region AA1 and the row number of pixel circuits in the second display region AA2 may be determined according to the formula that p=(q/t)+1 in the preceding embodiments. By way of example, the total row number of first pixel circuits 101 and second pixel circuits 102 is S, and the first a-rows of pixel circuits in the display panel 100 and the last b-rows of pixel circuits in the display panel 100 are all first pixel circuits 101, and the remaining rows of pixel circuits are all second pixel circuits 102. If the first display region AA1 includes A rows of pixel circuits and the second display region AA2 includes B rows of pixel circuits, wherein A and B each being an integer greater than or equal to 1, the part in the display panel 100 after the (a+A)-th row of pixel circuits is divided into a different region. In this manner, the (a+1)-th row of pixel circuits to the (a+A)-th row of pixel circuits are located in the first display region AA1, and B rows of pixel circuits starting from the (a+A+1)-th row of pixel circuits are located in the second display region AA2. The pixel circuits in the second display region AA2 are all second pixel circuits 102.

Figure 10:
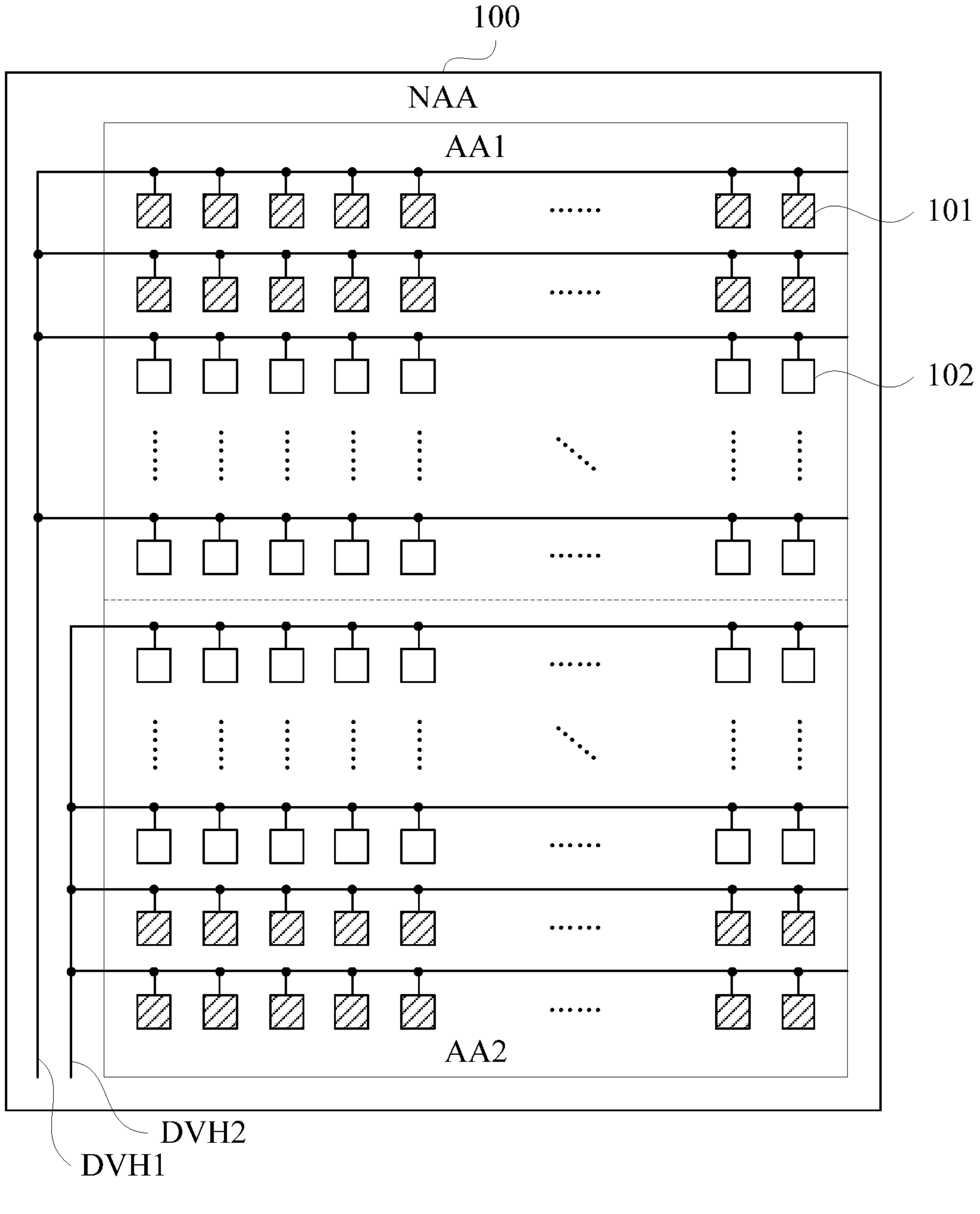
FIG. 10 is another structural diagram of a display panel according to an embodiment of the present invention.

FIG. 10 is another structural diagram of a display panel according to an embodiment of the present invention. Referring to FIG. 10, in an embodiment, any one of the first display region AA1 or the second display region AA2 includes first pixel circuits 101 and second pixel circuits 102. Illustratively, the total row number of first pixel circuits 101 and second pixel circuits 102 is S, and the first a-rows of pixel circuits in the display panel 100 and the last b-rows of pixel circuits in the display panel 100 are all first pixel circuits 101, and the remaining rows of pixel circuits are all second pixel circuits 102. If the first display region AA1 includes A rows of pixel circuits and the second display region AA2 includes B rows of pixel circuits, the part in the display panel 100 after the A-th row of pixel circuits is divided into different regions. In this manner, the first row of pixel circuits to the A-th row of pixel circuits are located in the first display region AA1, and the (A+1)-th row of pixel circuits to the S-th row of pixel circuits are located in the second display region AA2.

FIGS. 9 and 10 each illustrate the case where the display region of the display panel 100 includes the first display region AA1 and the second display region AA2. In other embodiments, when the display region of the display panel 100 further includes at least one third display region, any one of the first display region AA1, the second display region AA2, or the at least one third display region includes second pixel circuits 102 or any one of the first display region AA1, the second display region AA2, or the at least one third display region includes first pixel circuits 101 and second pixel circuits 102.

Figure 11:
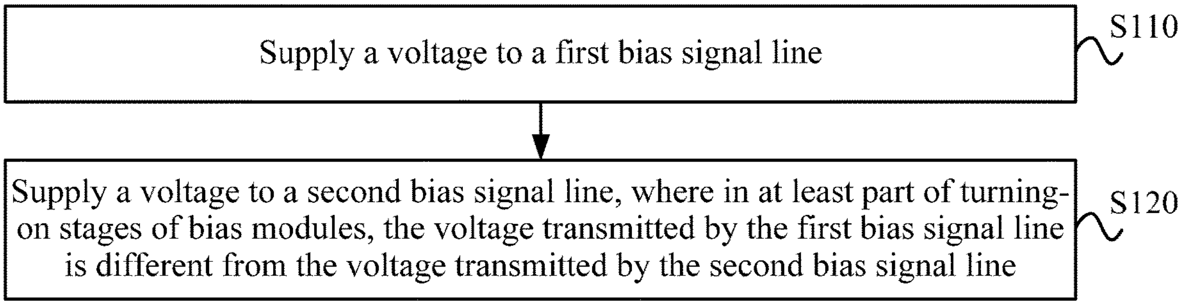
FIG. 11 is a flowchart of a driving method of a display panel according to an embodiment of the present invention.

Based on the same inventive concept, an embodiment of the present invention provides a driving method of a display panel. The driving method is used for driving the display panel according to any preceding embodiment to work. FIG. 11 is a flowchart of a driving method of a display panel according to an embodiment of the present invention. Referring to FIG. 11, the method specifically includes the steps below.

In S110, a voltage is supplied to a first bias signal line.

In S120, a voltage is supplied to a second bias signal line. In at least part of turning-on stages of bias modules, the voltage transmitted by the first bias signal line is different from the voltage transmitted by the second bias signal line.

For technical solutions of this embodiment of the present application, bias modules in the first display region are connected to the first bias signal line, and bias modules in the second display region are connected to the second bias signal line. With this arrangement, in at least part of turning-on stages of the bias modules of the at least one row of pixel circuits in the first display region or the second display region, the first bias signal line and the second bias signal line transmit different voltages, contributing to balancing the display effect of the first display region and the display effect of the second display region, and thereby alleviating the flicker and screen-splitting phenomena of the display panel.

On the basis of each preceding embodiment, optionally, the display region further includes at least one third display region. A third display region includes at least one row of pixel circuits. Bias signal lines further include at least one third bias signal line. The at least one third bias signal line corresponds to the at least one third display region. Illustratively, the at least one third bias signal line corresponds to the at least one third display region in a one-to-one manner. Correspondingly, the driving method of a display panel further includes the steps below.

A voltage is supplied to a third bias signal line. In at least part of turning-on stages of bias modules, voltages transmitted by bias signal lines corresponding to any two consecutive display regions among the first display region, the second display region, and the third display region are different.

Optionally, a bias module is configured to be turned on at a first bias stage and at a second bias stage. Correspondingly, the driving method of a display panel further includes the steps below.

A first bias voltage is supplied to a bias signal line at the first bias stage of each row of pixel circuits in a corresponding display region. A second bias voltage is supplied to the bias signal line at the second bias stage of each row of pixel circuits in the corresponding display region.

Optionally, a display period of the display panel includes a first display stage and a second display stage. The first bias stage is located at the first display stage. The second bias stage is located at the second display stage. The first display stage has i first bias stages, and the second display stage has j second bias stages, where i and j are each an integer greater than or equal to 1.

Correspondingly, the step in which the first bias voltage is supplied to the bias signal line at the first bias stage of each row of pixel circuits in the corresponding display region includes the step below.

The first bias voltage is supplied to the bias signal line during a period from the start of the first display stage of the first row of pixel circuits in the corresponding display region to the end of the i-th first bias stage of the last row of pixel circuits in the corresponding display region.

The step in which the second bias voltage is supplied to the bias signal line at the second bias stage of each row of pixel circuits in the corresponding display region includes the step below.

The second bias voltage is supplied to the bias signal line during a period from the start of the second display stage of the first row of pixel circuits in the corresponding display region to the end of the j-th second bias stage of the last row of pixel circuits in the corresponding display region.

Optionally, a control terminal of the bias module is connected with a first scan signal. The first scan signal includes i first turning-on levels located at the first display stage and j second turning-on levels located at the second display stage. The bias module is turned on at the first bias stages in response to the first turning-on levels in the first scan signal and is turned on at the second bias stages in response to the second turning-on levels in the first scan signal.

Correspondingly, the step in which the first bias voltage is supplied to the bias signal line during a period from the start of the first display stage of the first row of pixel circuits in the corresponding display region to the end of the i-th first bias stage of the last row of pixel circuits in the corresponding display region includes the step below.

The first bias voltage is supplied to the bias signal line during a period from the start of the first one of the first turning-on levels of the first scan signal accessed to the first row of pixel circuits in the corresponding display region to the end of the i-th one of the first turning-on levels of the first scan signal accessed to the last row of pixel circuits in the corresponding display region.

The step in which the second bias voltage is supplied to the bias signal line during a period from the start of the second display stage of the first row of pixel circuits in the corresponding display region to the end of the j-th second bias stage of the last row of pixel circuits in the corresponding display region includes the step below.

The second bias voltage is supplied to the bias signal line during a period from the start of the first one of the second turning-on levels of the first scan signal accessed to the first row of pixel circuits in the corresponding display region to the end of the j-th one of the second turning-on levels of the first scan signal accessed to the last row of pixel circuits in the corresponding display region.

Figure 12:
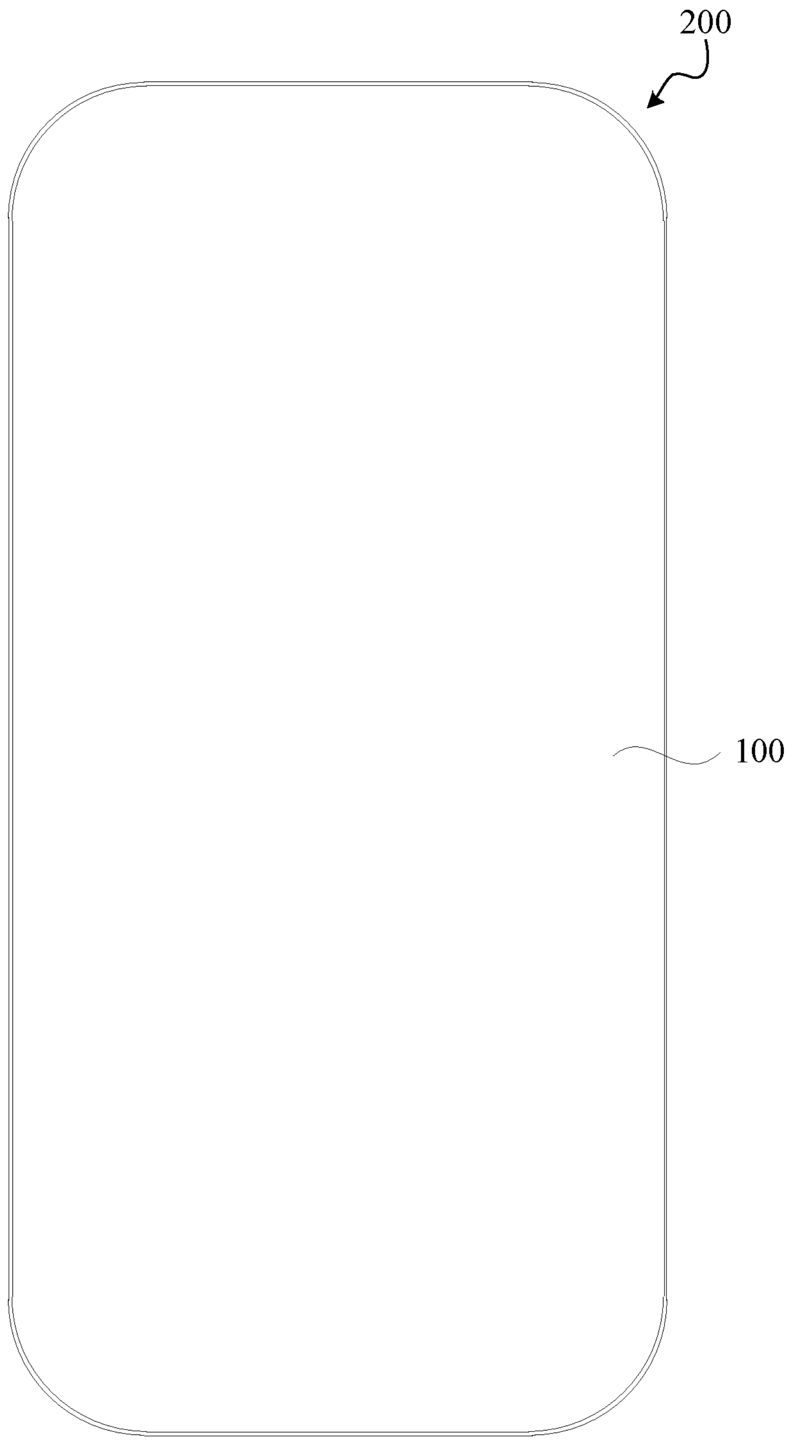
FIG. 12 is a structural diagram of a display apparatus according to an embodiment of the present invention.

Based on the same inventive concept, an embodiment of the present invention further provides a display apparatus. FIG. 12 is a structural diagram of a display apparatus according to an embodiment of the present invention. Referring to FIG. 12, the display apparatus 200 provided in this embodiment of the present invention includes the display panel 100 in any preceding embodiment. Therefore, the display apparatus 200 has corresponding functional structures and beneficial effects in the display panel 100. The details are not repeated here. The display apparatus may be a mobile phone or any electronic product with a display function, including, but not limited to, a television, a laptop, a desktop display, a tablet computer, a digital camera, a smart bracelet, smart glasses, an in-vehicle display, medical equipment, industrial control equipment, and a touch interactive terminal. No special limitations are made thereto in this embodiment of the present invention.

It is to be understood that various forms of processes shown above may be adopted with steps reordered, added, or deleted. For example, the steps described in the present invention may be performed in parallel, sequentially, or in different orders, as long as the desired results of technical solutions of the present invention can be achieved, and no limitation is imposed herein.

The preceding embodiments do not limit the scope of the present invention. It is to be understood by those skilled in the art that various modifications, combinations, sub-combinations and substitutions may be performed according to design requirements and other factors. Any modification, equivalent substitution, improvement, or the like made within the spirit and principle of the present invention is within the scope of the present invention.

What is claimed is:

1. A display panel, comprising:

a display region; and bias signal lines and a plurality of rows of pixel circuits;

wherein a pixel circuit among the plurality of rows of pixel circuits comprises a drive module and a bias module; the drive module is configured to drive a light-emitting element; and the bias module is connected between a first terminal of the drive module and a bias signal line among the bias signal lines, and the bias module is configured to write a voltage on the bias signal line to the first end of the drive module when the bias module is turned on;

wherein the display region comprises a first display region and a second display region; the bias signal lines comprise a first bias signal line and a second bias signal line; bias modules in the first display region are connected to the first bias signal line; bias modules in the second display region are connected to the second bias signal line; and in at least part of turn-on stages of bias modules, a voltage transmitted by the first bias signal line is different from a voltage transmitted by the second bias signal line;

wherein the bias module is configured to be turned on at a first bias stage and at a second bias stage; and the bias signal line is configured to input a first bias voltage at the first bias stage of each row of pixel circuits in a corresponding display region and input a second bias voltage at the second bias stage of the each row of pixel circuits in the corresponding display region, wherein the each row of pixel circuits are among the plurality of rows of pixel circuits;

wherein a display period of the display panel comprises a first display stage and a second display stage, the first bias stage is located at the first display stage, the second bias stage is located at the second display stage, the first display stage has i first bias stages, the second display stage has j second bias stages, and i and j are each an integer greater than or equal to 1; and wherein a control terminal of the bias module is connected with a first scan signal, the first scan signal comprises i first turning-on levels located at the first display stage and j second turning-on levels located at the second display stage, and the bias module is configured to be turned on at the first bias stages in response to the first turning-on levels in the first scan signal and is configured to be turned on at the second bias stages in response to the second turning-on levels in the first scan signal; and the bias signal line is further configured to:

input the first bias voltage during a period from a start of a first one of the first turning-on levels of the first scan signal connected to the first row of pixel circuits in the corresponding display region to an end of an i-th one of the first turning-on levels of the first scan signal connected to the last row of pixel circuits in the corresponding display region; and input the second bias voltage during a period from a start of a first one of the second turning-on levels of the first scan signal connected to the first row of pixel circuits in the corresponding display region to an end of a j-th one of the second turning-on levels of the first scan signal connected to the last row of pixel circuits in the corresponding display region.

2. The display panel according to claim 1, wherein the first display region and the second display region each comprise at least one row of pixel circuits among the plurality of rows of pixel circuits, and the first display region and the second display region are adjacent to each other.

3. The display panel according to claim 1, wherein the display region further comprises at least one third display region, a third display region among the at least one third display region comprises at least one row of pixel circuits among the plurality of rows of pixel circuits, the bias signal lines further comprise at least one third bias signal line, and the at least one third bias signal line corresponds to the at least one third display region; and bias modules in the third display region are connected to a corresponding third bias signal line among the at least one third bias signal line; and in at least part of turning-on stages of bias modules, voltages transmitted by bias signal lines corresponding to any two consecutive display regions among the first display region, the second display region, and the third display region are different.

4. The display panel according to claim 3, wherein the first display region, the second display region, and the at least one third display region are adjacent sequentially; and in a case where multiple third display regions are provided, the multiple third display regions are adjacent sequentially.

5. The display panel according to claim 1, wherein the first display stage is a write frame, and the second display stage is a retention frame.

6. The display panel according to claim 1, wherein i=2.

7. The display panel according to claim 1, wherein the display region further comprises the at least one third display region, a total number of the first display region, the second display region and the at least one third display region is equal to i.

8. The display panel according to claim 1, wherein a row number of pixel circuits in any one of the first display region, the second display region, or the third display region is calculated as that p=(q/t)+1, wherein p denotes a row number of pixel circuits in a corresponding display region, q denotes an interval between the first one of first turning-on levels of the first scan signal connected to the first row of pixel circuits in the corresponding display region and a first one of first turning-on levels of the first scan signal connected to the last row of pixel circuits in the corresponding display region, and t denotes a scan time interval between two adjacent rows of pixel circuits in the corresponding display region.

9. The display panel according to claim 1, wherein the plurality of rows of pixel circuits comprise first pixel circuits and second pixel circuits, the first pixel circuits and the second pixel circuits have a same structure, the first pixel circuits are dummy pixel circuits, and any one of the first display region or the second display region comprises second pixel circuits or any one of the first display region or the second display region comprises first pixel circuits and second pixel circuits.

10. A driving method of a display panel, wherein the display panel has a display region; the display panel comprises bias signal lines and a plurality of rows of pixel circuits; the plurality of rows of pixel circuits are located in the display region; a pixel circuit among the plurality of rows of pixel circuits comprises a drive module and a bias module; the drive module is configured to drive a light-emitting element; and the bias module is connected between a first terminal of the drive module and a bias signal line among the bias signal lines and the bias module is configured to write a voltage on the bias signal line to the first end of the drive module when the bias module is turned on, wherein the display region comprises a first display region and a second display region; the bias signal lines comprise a first bias signal line and a second bias signal line; bias modules in the first display region are connected to the first bias signal line; and bias modules in the second display region are connected to the second bias signal line; and wherein the driving method of a display panel comprises:

supplying voltages to the first bias signal line and the second bias signal line separately, wherein in at least part of turning-on stages of bias modules, a voltage transmitted by the first bias signal line is different from a voltage transmitted by the second bias signal line;

wherein the bias module is configured to be turned on at a first bias stage and at a second bias stage; and wherein the driving method of the display panel further comprises:

supplying a first bias voltage to the bias signal line at the first bias stage of each row of pixel circuits in a corresponding display region, wherein the each row of pixel circuits is among the plurality of rows of pixel circuits; and supplying a second bias voltage to the bias signal line at the second bias stage of the each row of pixel circuits in the corresponding display region;

wherein a display period of the display panel comprises a first display stage and a second display stage, the first bias stage is located at the first display stage, the second bias stage is located at the second display stage, the first display stage has i first bias stages, the second display stage has j second bias stages, and i and j are each an integer greater than or equal to 1;

wherein a control terminal of the bias module is connected with a first scan signal, the first scan signal comprises i first turning-on levels located at the first display stage and j second turning-on levels located at the second display stage, and the bias module is configured to be turned on at the first bias stages in response to the first turning-on levels in the first scan signal and is configured to be turned on at the second bias stages in response to the second turning-on levels in the first scan signal;

wherein supplying the first bias voltage to the bias signal line at the first bias stage of each row of pixel circuits in a corresponding display region, wherein the each row of pixel circuits is among the plurality of rows of pixel circuits, comprises:

supplying the first bias voltage to the bias signal line during a period from a start of a first one of the first turning-on levels of the first scan signal connected to the first row of pixel circuits in the corresponding display region to an end of an i-th one of the first turning-on levels of the first scan signal connected to the last row of pixel circuits in the corresponding display region; and wherein supplying the second bias voltage to the bias signal line at the second bias stage of the each row of pixel circuits in the corresponding display region, comprises:

supplying the second bias voltage to the bias signal line during a period from a start of a first one of the second turning-on levels of the first scan signal connected to the first row of pixel circuits in the corresponding display region to an end of a j-th one of the second turning-on levels of the first scan signal connected to the last row of pixel circuits in the corresponding display region.

11. The driving method of a display panel according to claim 10, wherein the display region further comprises at least one third display region, a third display region among the at least one third display region comprises at least one row of pixel circuits among the plurality of rows of pixel circuits, the bias signal lines further comprise at least one third bias signal line, and the at least one third bias signal line corresponds to the at least one third display region; and wherein the driving method of a display panel further comprises:

supplying a voltage to a third bias signal line among the at least one third bias signal line, wherein in at least part of turning-on stages of bias modules, voltages transmitted by bias signal lines corresponding to any two consecutive display regions among the first display region, the second display region, and the third display region are different.

12. The driving method according to claim 10, wherein i=2.

13. The driving method according to claim 10, wherein the display region further comprises the at least one third display region, a total number of the first display region, the second display region and the at least one third display region is equal to i.

14. The driving method according to claim 10, wherein a row number of pixel circuits in any one of the first display region, the second display region, or the third display region is calculated as that p=(q/t)+1, wherein p denotes a row number of pixel circuits in a corresponding display region, q denotes an interval between the first one of first turning-on levels of the first scan signal connected to the first row of pixel circuits in the corresponding display region and a first one of first turning-on levels of the first scan signal connected to the last row of pixel circuits in the corresponding display region, and t denotes a scan time interval between two adjacent rows of pixel circuits in the corresponding display region.

15. A display apparatus, comprising a display panel; wherein the display panel comprises a display region, bias signal lines and a plurality of rows of pixel circuits;

wherein a pixel circuit among the plurality of rows of pixel circuits comprises a drive module and a bias module; the drive module is configured to drive a light-emitting element; and the bias module is connected between a first terminal of the drive module and a bias signal line among the bias signal lines, and the bias module is configured to write a voltage on the bias signal line to the first end of the drive module when the bias module is turned on; and wherein the display region comprises a first display region and a second display region; the bias signal lines comprise a first bias signal line and a second bias signal line; bias modules in the first display region are connected to the first bias signal line; bias modules in the second display region are connected to the second bias signal line; and in at least part of turn-on stages of bias modules, a voltage transmitted by the first bias signal line is different from a voltage transmitted by the second bias signal line;

wherein the bias module is configured to be turned on at a first bias stage and at a second bias stage; and the bias signal line is configured to input a first bias voltage at the first bias stage of each row of pixel circuits in a corresponding display region and input a second bias voltage at the second bias stage of the each row of pixel circuits in the corresponding display region, wherein the each row of pixel circuits are among the plurality of rows of pixel circuits;

wherein a display period of the display panel comprises a first display stage and a second display stage, the first bias stage is located at the first display stage, the second bias stage is located at the second display stage, the first display stage has i first bias stages, the second display stage has j second bias stages, and i and j are each an integer greater than or equal to 1; and wherein a control terminal of the bias module is connected with a first scan signal, the first scan signal comprises i first turning-on levels located at the first display stage and j second turning-on levels located at the second display stage, and the bias module is configured to be turned on at the first bias stages in response to the first turning-on levels in the first scan signal and is configured to be turned on at the second bias stages in response to the second turning-on levels in the first scan signal; and the bias signal line is further configured to:

input the first bias voltage during a period from a start of a first one of the first turning-on levels of the first scan signal connected to the first row of pixel circuits in the corresponding display region to an end of an i-th one of the first turning-on levels of the first scan signal connected to the last row of pixel circuits in the corresponding display region; and input the second bias voltage during a period from a start of a first one of the second turning-on levels of the first scan signal connected to the first row of pixel circuits in the corresponding display region to an end of a j-th one of the second turning-on levels of the first scan signal connected to the last row of pixel circuits in the corresponding display region.

16. The display apparatus according to claim 15, wherein the display region further comprises at least one third display region, a third display region among the at least one third display region comprises at least one row of pixel circuits among the plurality of rows of pixel circuits, the bias signal lines further comprise at least one third bias signal line, and the at least one third bias signal line corresponds to the at least one third display region; and bias modules in the third display region are connected to a corresponding third bias signal line among the at least one third bias signal line; and in at least part of turning-on stages of bias modules, voltages transmitted by bias signal lines corresponding to any two consecutive display regions among the first display region, the second display region, and the third display region are different.

17. The driving apparatus according to claim 15, wherein i=2.

18. The driving apparatus according to claim 15, wherein the display region further comprises the at least one third display region, a total number of the first display region, the second display region and the at least one third display region is equal to i.

19. The driving apparatus according to claim 15, wherein a row number of pixel circuits in any one of the first display region, the second display region, or the third display region is calculated as that $p=(q/t)+1$, wherein p denotes a row number of pixel circuits in a corresponding display region, q denotes an interval between the first one of first turning-on levels of the first scan signal connected to the first row of pixel circuits in the corresponding display region and a first one of first turning-on levels of the first scan signal connected to the last row of pixel circuits in the corresponding display region, and t denotes a scan time interval between two adjacent rows of pixel circuits in the corresponding display region.

20. The driving apparatus according to claim 15, wherein the plurality of rows of pixel circuits comprise first pixel circuits and second pixel circuits, the first pixel circuits and the second pixel circuits have a same structure, the first pixel circuits are dummy pixel circuits, and any one of the first display region or the second display region comprises second pixel circuits or any one of the first display region or the second display region comprises first pixel circuits and second pixel circuits.

* * * * *